US008922763B2

(12) United States Patent
Tudury et al.

(10) Patent No.: US 8,922,763 B2
(45) Date of Patent: Dec. 30, 2014

(54) METHODS OF MANUFACTURING AN IMPROVED MULTIMODE OPTICAL FIBER

(71) Applicant: Panduit Corp., Tinley Park, IL (US)

(72) Inventors: Gaston E. Tudury, Lockport, IL (US); Richard J. Pimpinella, Frankfort, IL (US); Brett Lane, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 13/966,865

(22) Filed: Aug. 14, 2013

(65) Prior Publication Data

US 2014/0204367 A1   Jul. 24, 2014

Related U.S. Application Data

(63) Continuation of application No. 12/909,129, filed on Oct. 21, 2010, now Pat. No. 8,531,654.

(51) Int. Cl.
*G01N 21/00* (2006.01)
*G01M 11/00* (2006.01)
*G02B 6/02* (2006.01)

(52) U.S. Cl.
CPC .......... *G01M 11/30* (2013.01); *G02B 6/02214* (2013.01)
USPC ...................................................... 356/73.1

(58) Field of Classification Search
USPC ........................................................ 356/73.1
See application file for complete search history.

(56) References Cited

U.S. PATENT DOCUMENTS

| 6,400,450 | B1 | 6/2002 | Golowich et al. | |
|---|---|---|---|---|
| 6,762,828 | B1 | 7/2004 | Duchenne et al. | |
| 6,788,397 | B1 | 9/2004 | Golowich et al. | |
| 7,995,888 | B2 | 8/2011 | Gholami et al. | |
| 2007/0223556 | A1* | 9/2007 | Lee et al. | 374/1 |

FOREIGN PATENT DOCUMENTS

EP     2144096 A1     1/2010

OTHER PUBLICATIONS

Optical Fiber Communication, "Modal and Chromatic Dispersions Interference in VCSEL and MMF based Gigabit Ethernet Link", Gholami, et al., 3 pages, Mar. 22, 2009.
Design of New Dispersion-Compensation Optical Fiber, Wei Wang et al., Journal of Optoelectronics-Laser, vol. 6, Issue 1, pp. 15-17, Feb. 28, 1995.

\* cited by examiner

*Primary Examiner* — Tu Nguyen
(74) *Attorney, Agent, or Firm* — Christopher S. Clancy; Yuri Astvatsaturov

(57) ABSTRACT

A method for compensating for both material or chromatic dispersion and modal dispersion effects in a multimode fiber transmission system is provided. The method includes, but is not limited to measuring a fiber-coupled spatial spectral distribution of the multimode fiber laser transmitter connected with a reference multimode fiber optical cable and determining the amount of chromatic dispersion and modal dispersion present in the reference multimode fiber optic cable. The method also includes, but is not limited to, designing an improved multimode fiber optic cable which compensates for at least a portion of the chromatic dispersion and modal dispersion present in the reference multimode fiber optic cable resulting from the transmitter's fiber-coupled spatial spectral distribution.

14 Claims, 22 Drawing Sheets

(a)

(b)

(a)

(b)

(a)

(b)

(a)

(b)

METHODS OF MANUFACTURING AN IMPROVED MULTIMODE OPTICAL FIBER

CROSS-REFERENCE TO RELATED APPLICATIONS

This application is a continuation of U.S. patent application Ser. No. 12/909,129, filed Oct. 21, 2010, the subject matter of which is hereby incorporated by reference in its entirety.

FIELD OF THE INVENTION

The present invention relates to a new Differential Mode Delay (DMD) specification which is provided for making and utilizing laser-optimized multimode fiber optic cable (MMF) that utilizes the radial dependence of the fiber-coupled wavelength distribution to compensate modal and chromatic dispersion for improved channel performance.

The present invention also relates to a multimode fiber optic sub-assembly having a specified fiber-coupled spatial spectral distribution. The multimode fiber optic sub-assembly includes a multimode fiber transmitter optical sub-assembly (TOSA) for use with a specifically designed MMF. Knowledge of the fiber-coupled spatial spectral distribution allows dispersive phenomena, inherent in multimode fiber optic communications system, to be compensated by specifically designed MMF thereby facilitating improved systems performance.

BACKGROUND

Most high-speed optical channel links in short-reach data communication networks employ MMF. Transceivers that support these channel links use Vertical Cavity Surface Emitting Laser (VCSEL) sources for data rates of 1 Gb/s and higher. To achieve link distances in excess of 200 meters, the design of MMF has been optimized for VSCEL transmission with a center wavelength of 850 nm. An MMF optimized for VCSEL transmission is called Laser-Optimized MMF, and is specified in TIA-492AAAC and TIA-492AAAD as OM3 (fibre type A1a.2) and OM4 (fibre type A1a.3) fiber types respectively.

Due to the wave nature of light and the wave guiding properties of optical fiber, an optical signal traverses the fiber along discrete optical paths called modes. The optical power of the pulse is carried by the sum of the discrete modes. The difference in propagation delays between the fastest and slowest modes in the fiber determines the inter-modal dispersion or simply modal dispersion. MMF should ideally be optimized so that all modes arrive at the output of the fiber at the same time to minimize modal dispersion. This has traditionally been achieved by shaping or "grading" the refractive index profile of the fiber core according to the parabolic distribution defined by $$n^2(r) = \begin{cases} n_1^2[1 - 2\Delta n(r/a)^\alpha] & r \leq a \\ n_2 & r > a \end{cases} \quad (1)$$

Where, $\alpha$ is the core diameter (50 μm), $n_1$ is the refractive index at the core center, $n_2$ is the refractive index of the cladding, $\alpha$ is a number close to 2, and $$\Delta n = \frac{n_1^2 - n_2^2}{2n_1^2}. \quad (2)$$

The traditional refractive index profile described by Equation (1) assumes that all modes have substantially the same wavelength and is considered the traditional "ideal" profile that results in minimum modal dispersion. Modes that travel with larger angles (and consequently traverse longer distances) encounter a lower refractive index on average and travel faster. These are called high-order modes. Modes traveling with small angles (low-order modes) encounter a higher refractive index on average and travel slower.

Much attention has been focused on minimizing modal dispersion of Laser-Optimized MMF by optimizing the refractive index profile of the fiber. Modal dispersion is the temporal distortion of an optical signal due to differences in the various modes' propagation velocities. Conversely, with respect to MMF, comparatively little attention has been focused on reducing the effects of material dispersion. Material dispersion is the temporal distortion of an optical signal due to differences in the propagation velocities of the various spectral components that comprise the optical signal. More generally, chromatic dispersion is a combination of material dispersion and waveguide dispersion where the waveguide properties change with wavelength.

As a result, it is desirable to provide an improved method for manufacturing MMF which accounts for and compensates for not only modal dispersion, but also material dispersion.

Additionally, due to the radially dependent wavelength emission pattern of laser transmitters, fiber-coupled modes have a radial wavelength dependency that results in appreciable material dispersion. Consequently, the total dispersion of the MMF system depends not only on the modal dispersion and material dispersion within MMF but also on the interaction between MMF and the emitting spectrum of the laser transmitter (oftentimes a VCSEL), all of which is governed by a fiber-coupled spatial spectral distribution.

The fiber-coupled spatial spectral distribution is dependent on the emitting spectrum of a laser transmitter which generates light radiation which travels down the MMF, and the manner in which the VCSEL's generated light radiation is coupled into the MMF. With reference to FIGS. 15 and 16, a Transmitter Optical Sub-Assembly (TOSA) 120 is used to couple light emitted from a VCSEL 124 into a fiber connector ferrule 132 mated to a transceiver 112 which houses both the TOSA 120 and a Receiver Optical Sub-Assembly (ROSA) 130. The ROSA is used for light detection. With reference to FIGS. 15 and 16, most generally, a TOSA comprises the following components: 1) a packaged VCSEL 124; 2) a lens 126; 3) a precision receptacle 128 for receiving a removable fiber connector ferrule 132; 4) a TOSA housing 121; and 5) an electrical connection 123 to a transceiver PCB. The packaged VCSEL 124 is most often packaged in a hermetically sealed package to improve device reliability. The lens 126 may be integrated into the packaged VCSEL 124 or molded into the TOSA housing 121. An illustration of a transceiver showing the TOSA is provided in FIG. 15 and a cross-sectional schematic of a TOSA is provided in FIG. 16.

For illustrative purposes only, it may be considered that the components of the TOSA 120 must be carefully aligned to achieve acceptable performance. An example assembly process for TOSA 120 may be summarized by the following steps. First, secure the lens 126 to the TOSA housing 121. Typically this is done by a press-fit, epoxy (thermal or UV cure) or laser welding. Second, position the TOSA housing 121 with lens 126 over an electronically addressable VCSEL 124. Third, insert the fiber connector ferrule 132 into the TOSA housing 121. Fourth, turn the VCSEL 124 on. Fifth, align the VCSEL 124 with respect to the TOSA housing 121, including lens 126 and fiber connector ferrule 132, to achieve the desired fiber-coupled power. Typically a 3-axis alignment is performed (x,y,z). Optical alignment of the TOSA 120 is typically achieved by inserting a fiber connector ferrule 132 into the receiving end of the TOSA 120 and optimizing for the maximum optical power as a function of VCSEL 124-to-package placement. Sixth, secure the VCSEL 124 to the TOSA housing 121. Typically this is done with epoxy (thermal or UV cure) or laser welding. Finally, remove the fiber connector ferrule 132 from the completed TOSA 120.

The different transverse modes of multimode VCSELs have different emission angles; higher-order modes have larger emission angles. It is also known that higher-order VCSEL modes have shorter wavelengths. When coupled into multimode fiber, the spectrum of the higher-order fiber modes will have a reduced central wavelength, $\lambda_c$ compared to lower-order fiber modes. The measurement procedure described in TIA-455-127-A may be used to measure the emitting spectrum and determine its central wavelength, $\lambda_c$.

With reference to FIG. 17, when the components of TOSA 120 are pre-selected and aligned with tolerances within 1 mm or less, higher-order VCSEL modes are coupled into the higher-order fiber modes located farther from the center of the fiber core, $\lambda_{c\ outer}$. Conversely, lower-order VCSEL modes, which also have a longer central wavelength, are expected to be coupled into the lower-order fiber modes located near the fiber core center, $\lambda_{c\ inner}$.

However, with reference to FIG. 18, if the components of TOSA 120 are not precise and/or are in poor alignment, due to debris or misalignment issues such as VCSEL offset within the TOSA package or lens 126 is offset within the TOSA housing 121, the expected proportional relationship between VCSEL modes and fiber modes may not be realized. In fact, the optical system comprising the TOSA 120 may be such that higher-order VCSEL modes are coupled into low-order fiber modes and vice versa. It is essential to recognize that although imprecise components and/or poor alignment may result in optical aberrations, the fiber-coupled power may still exceed the specification minimum.

Numerous conditions, including environmental ones, may result in such a situation. Some examples include: 1) Misplacement of the VCSEL within the TOSA package; 2) Debris in the optical path; 3) Lens defects (e.g. moderate radius of curvature, excessive radius of curvature); 4) Thermal expansion (or contraction) of the various components comprising the TOSA; 5) Debris inside the ferrule bore preventing complete insertion; 6) Excessive ferrule concentricity; 7) Excessive fiber concentricity; and 8) TOSA housing defects.

There exists a need to have a transceiver that produces a predetermined fiber-coupled spatial spectral distribution that results in a material or chromatic dispersion that can be readily compensated for with a single fiber design. As a result, it would be desirable to provide an improved method for manufacturing a TOSA that produces a controlled fiber-coupled optical spectral distribution.

SUMMARY

In one aspect, a method for compensating for both material or chromatic dispersion and modal dispersion effects in a multimode fiber transmission system is provided. The method includes, but is not limited to measuring a fiber-coupled spatial spectral distribution of the multimode fiber laser transmitter connected with a reference multimode fiber optical cable and determining the amount of chromatic dispersion and modal dispersion present in the reference multimode fiber optic cable. The method also includes, but is not limited to, designing an improved multimode fiber optic cable which compensates for at least a portion of the chromatic dispersion and modal dispersion present in the reference multimode fiber optic cable resulting from the transmitter's fiber-coupled spatial spectral distribution.

In one aspect, a method for compensating for both chromatic dispersion and modal dispersion effects in a multimode fiber transmitter optical sub-assembly is provided. The method includes, but is not limited to measuring a fiber-coupled spatial spectral distribution of the multimode fiber transmitter optical sub-assembly connected with a reference multimode fiber optic cable and determining the amount of chromatic dispersion and modal dispersion present in the reference multimode fiber optic cable.

In one aspect, a method for compensating for both chromatic dispersion and modal dispersion effects in a reference multimode fiber transmitter optical sub-assembly is provided. The method includes, but is not limited to, measuring a fiber-coupled spatial spectral distribution of the reference multimode fiber transmitter optical sub-assembly connected with a reference multimode fiber optic cable and determining the amount of chromatic dispersion and modal dispersion present in the reference multimode fiber optic cable. The method also includes, but is not limited to, designing an improved multimode fiber transmitter optical sub-assembly, which compensates for at least a portion of the chromatic dispersion and modal dispersion present in the reference multimode fiber optic cable.

In one aspect, a method for compensating for both chromatic dispersion and modal dispersion effects in a multimode fiber optic cable is provided. The method includes, but is not limited to, generating an optical signal into a reference multimode fiber optic cable and measuring a wavelength dependent time of flight for a plurality of guided modes of the optical signal in the reference multimode fiber optic cable. The method also includes, but is not limited to, determining the amount of chromatic dispersion and modal dispersion present in the reference multimode fiber cable, and designing an improved multimode fiber optic cable which compensates for at least a portion of the chromatic dispersion and modal dispersion present in the reference multimode fiber optic cable.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

Figure 1:
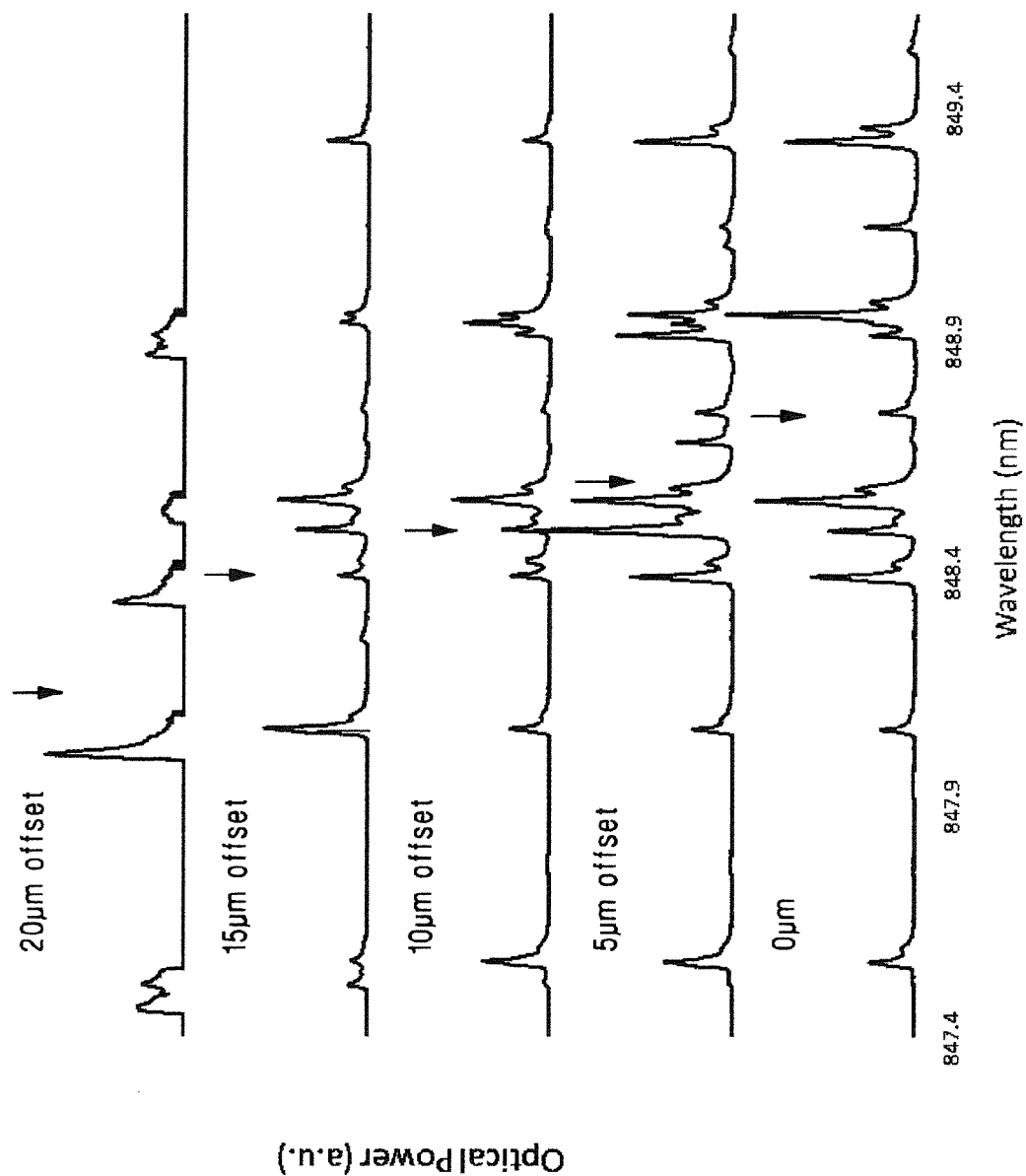
FIG. 1 depicts a graph of optical spectrums of modes propagating in a MMF for five radial offsets from the multimode fiber core center, in accordance with one embodiment of the present invention.

The present invention makes use of the discovery that due to the radially dependent wavelength emission pattern of VCSELs and the manner in which light is coupled into the fiber, the fiber-coupled modes have spectral components that depend on fiber radii and result in a chromatic or material dispersion effect that cannot be neglected. FIG. 1 illustrates the optical spectrums of the modes propagating in a MMF for five radial offsets across the fiber core. The center wavelength, or central wavelength, for each radial spectrum is indicated by the down arrow. As shown in FIG. 1, for this particular optical transmitter, on average the central wavelength of a fiber mode shifts to a shorter wavelength for larger radial offsets. This radial wavelength dependence causes fiber modes to undergo a chromatic or material dispersion relative to each other in addition to modal dispersion. Consequently, the refractive index profile must be modified to compensate for this material dispersion effect and thereby minimize the total dispersion realized by a fiber and transmitter combination.

Figure 17:
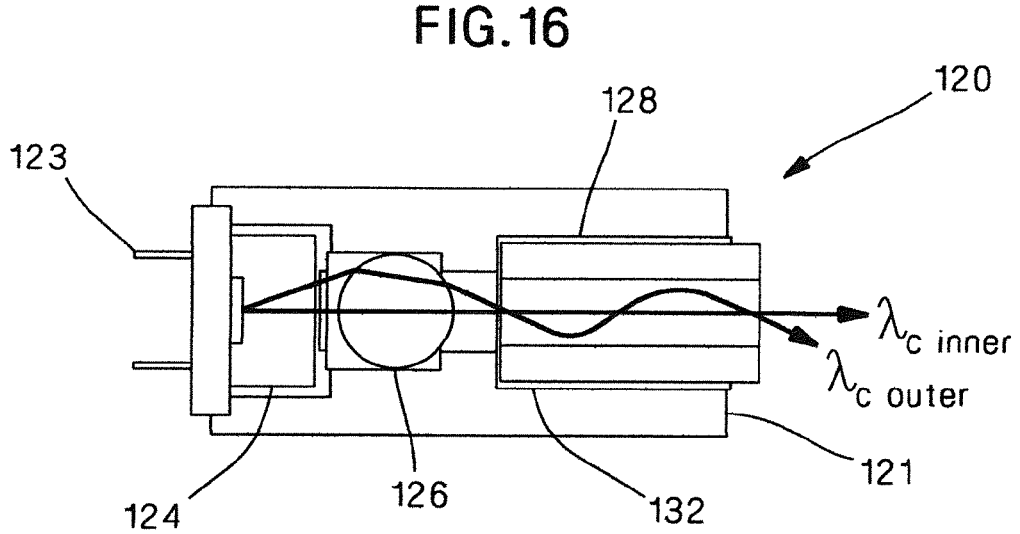
FIG. 17 depicts a cross-sectional schematic of a TOSA having components which are precise and well-aligned, in accordance with one embodiment of the present invention.
Figure 18:
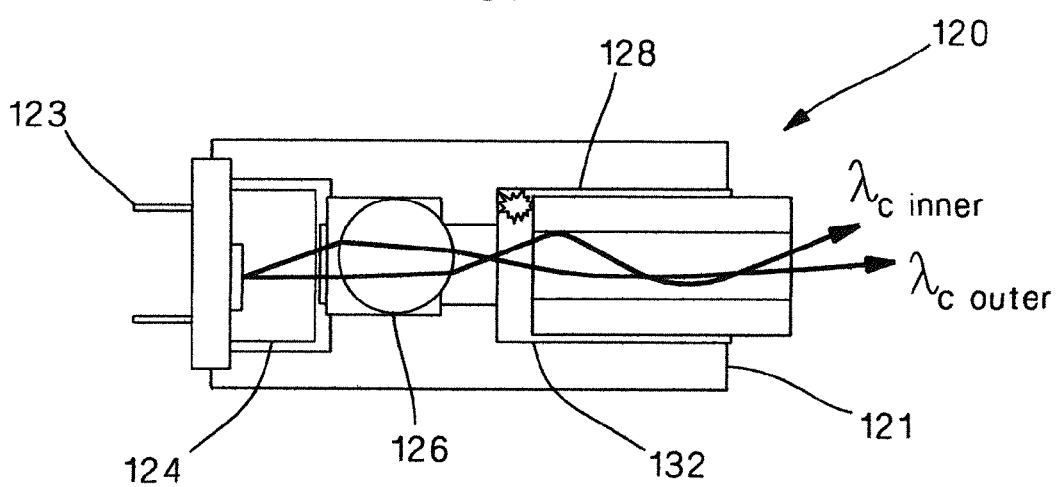
FIG. 18 depicts a cross-sectional schematic of a TOSA having components which are not precise and well-aligned, in accordance with one embodiment of the present invention.

The present invention also makes use of the discovery that high-order VCSEL modes may be coupled into high-order fiber modes as shown in FIG. 17, by requiring more precise TOSA components and more precise alignment of the TOSA components during the manufacturing process to take into account the effects of material dispersion as well as modal dispersion.

In one aspect, the present invention describes a new DMD specification for laser optimized multimode fiber that compensates modal and material dispersion effects caused by the radially dependent shift in wavelengths of the fiber modes. The required compensation depends on the spatial spectral characteristics of the VCSEL, the coupling of the VCSEL modes into fiber modes, and the modal dispersion properties of the fiber. MMF designed to compensate for the radial shift in wavelength will exhibit reduced total dispersion and improved system performance. Since current DMD and Effective Modal Bandwidth (EMB) test methods neglect the radial wavelength dependence of the fiber modes, they do not accurately characterize the modal dispersion or bandwidth performance realized in a transmission system. To verify the new DMD specification, we applied an improved algorithm for calculating DMD and bandwidth, as disclosed in U.S. Patent Application Ser. No. 61/237,827, to calculate the DMD and EMB for a sample set of VCSELs for varying amounts of material dispersion compensation.

Figure 2:
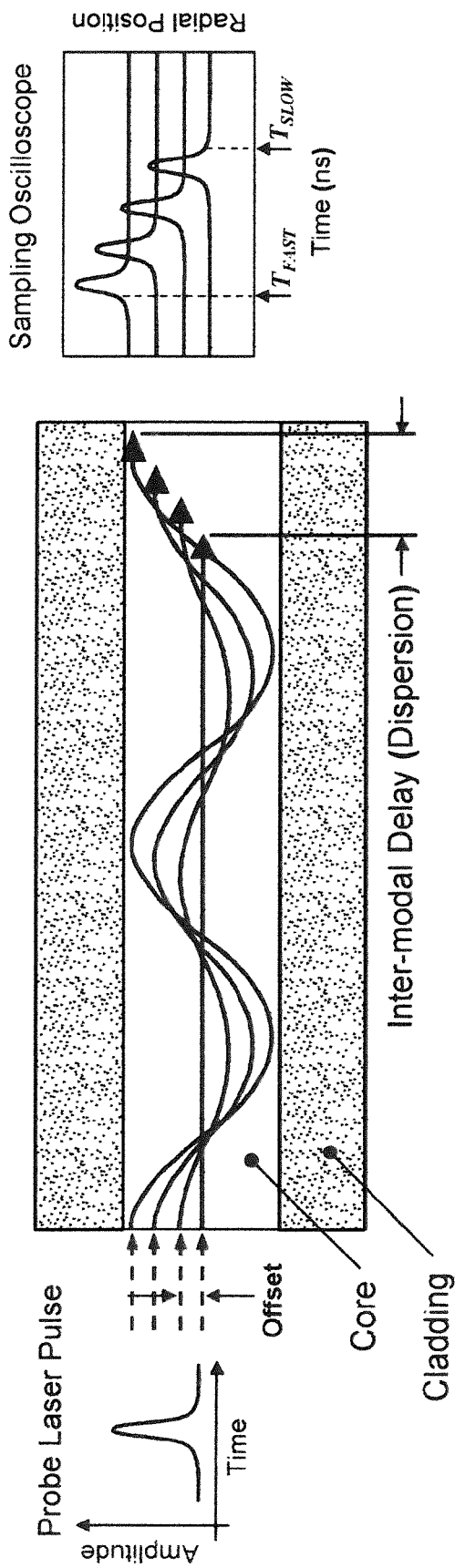
FIG. 2 depicts a graph of propagation delay of a resultant output pulse recorded by a sampling oscilloscope for four radial offsets.

The test method used to characterize the bandwidth of laser optimized MMF is DMD, specified in the TIA-455-220-A standard. DMD is a measure of the difference in propagation delay between the fastest and slowest modes traversing a MMF expressed in units of ps/m, while the effect of chromatic dispersion is minimized. The larger the relative delay between modes, the larger the dispersion (i.e. modal dispersion). To measure the DMD, an optical reference pulse emitted from the end of a single-mode launch fiber is stepped across the core of the MMF under test. For each radial offset, the propagation delay of the resultant output pulse is recorded by a sampling oscilloscope, as illustrated in FIG. 2.

Figure 3:
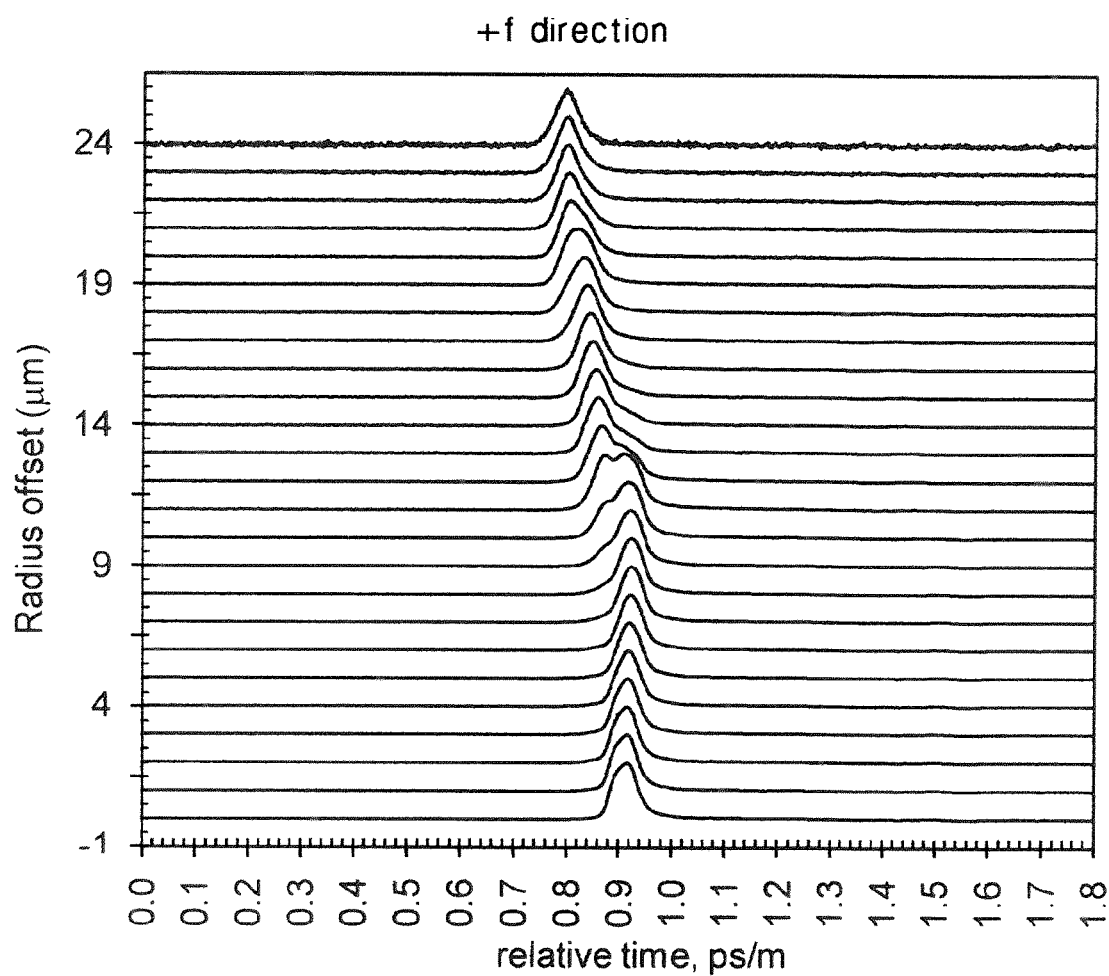
FIG. 3 depicts a graph of a DMD waveform plot for a representative OM4 fiber sample A, in accordance with one embodiment of the present invention.

The output waveform contains only those modes excited by the launch pulse for a given radial offset. In this measurement the spectral characteristics of the launch pulse remain constant. To compute the DMD, the set of output waveforms for each of the radial offsets (0 to 24 µm) are first recorded. A plot of the waveforms is shown in FIG. 3. The plot shows the relative pulse delay, or "relative time" in picoseconds per meter (ps/m) at the output end of the fiber (x-axis) as a function of the radial offset of a launch pulse (y-axis) as measured from the core center. The DMD is determined by measuring the difference in pulse delay between the leading edge of the fastest pulse and the trailing edge of the slowest pulse. From this difference we subtract the temporal width of the launch pulse, which yields the modal dispersion of the fiber. To specify the fiber as OM3 or OM4, the DMD must meet minimum dispersion values within several radial regions of the core.

Figure 4A:
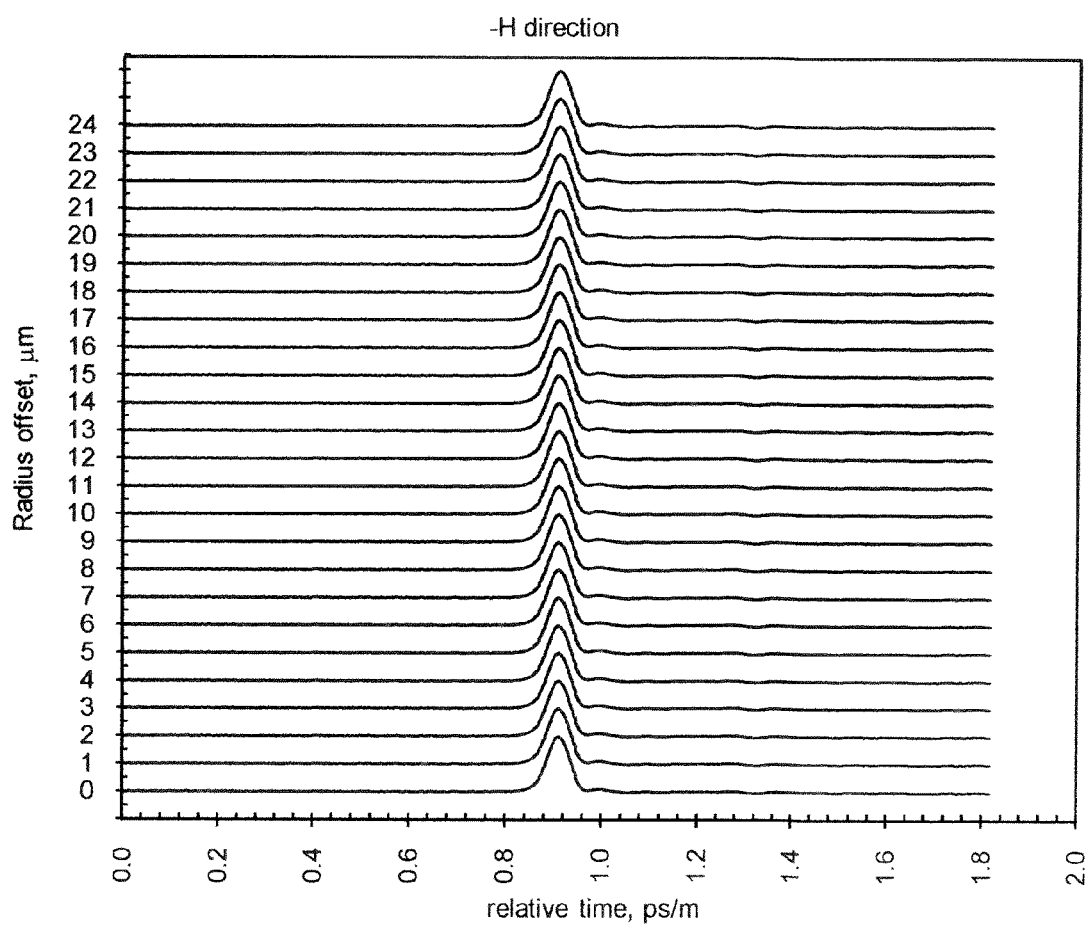
FIG. 4A depicts a graph of a current ideal DMD waveform plot where all waveforms have the same delay and are therefore aligned, in accordance with one embodiment of the present invention.
Figure 5:
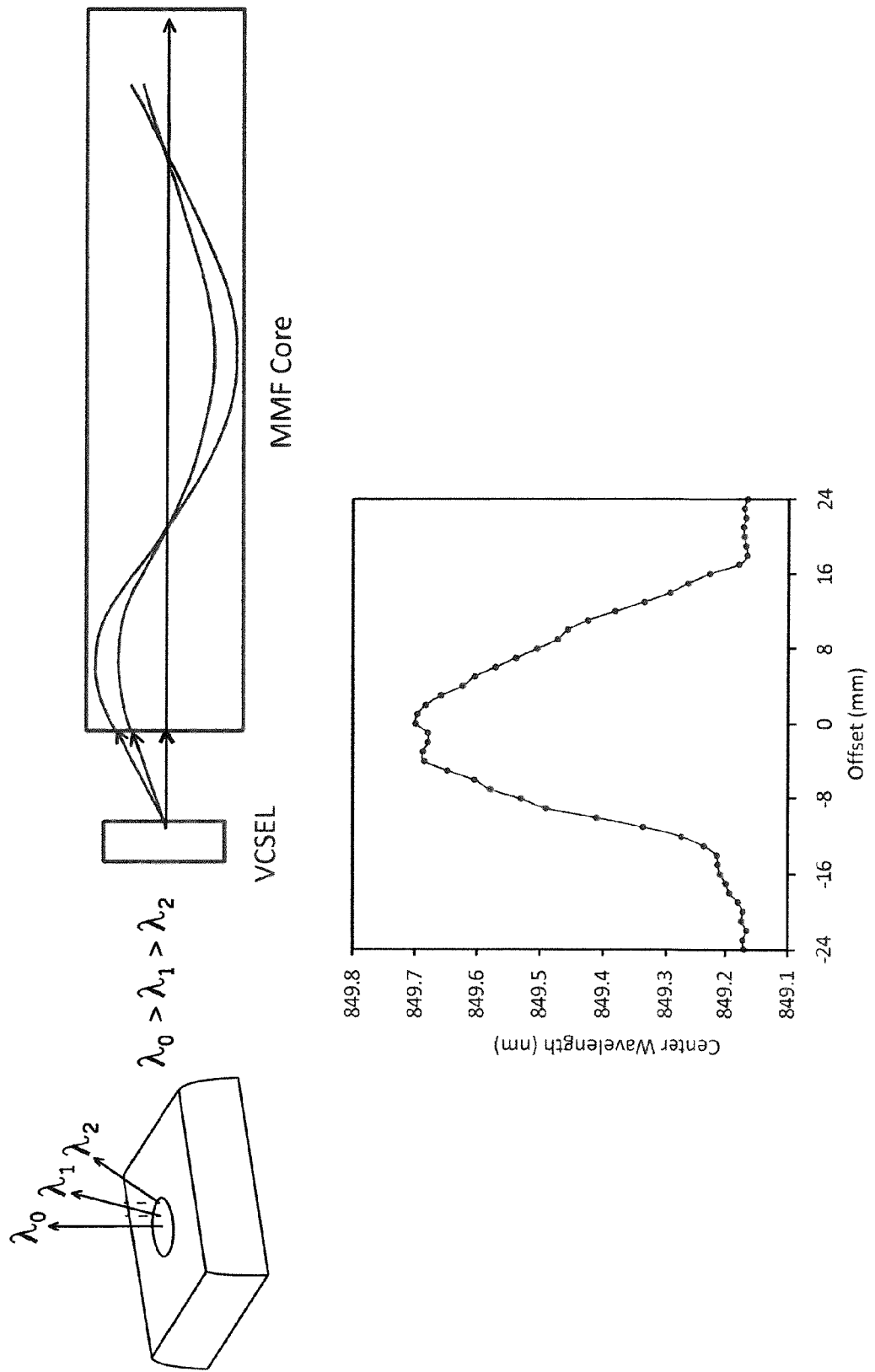
FIG. 5 depicts a graph of a VCSEL emission pattern which has a wavelength dependency that results in a radial wavelength dependency of the coupled fiber modes as a function of offset, as shown on rightmost chart, in accordance with one embodiment of the present invention.

Currently, it is generally believed that the DMD waveform plot that minimizes modal dispersion is when all the radially offset waveforms arrive at the output of the fiber at the same time as shown in FIG. 4A. This is true if each of the radial fiber modes (output waveforms) is excited by launch pulses having the same spectral characteristics. However, since higher-order VCSEL modes emitted into larger launch angles have shorter wavelengths, on average, than those modes emitted into smaller launch angles (see FIG. 5), that assumption is not valid. When VCSEL modes are coupled into the fiber, low-order modes and high-order modes undergo different amounts of material dispersion in addition to modal dispersion. Material dispersion occurs because the refractive index of a material changes with wavelength, i.e., $$\frac{dn}{d\lambda} \neq 0 \quad (3)$$

Figure 4B:
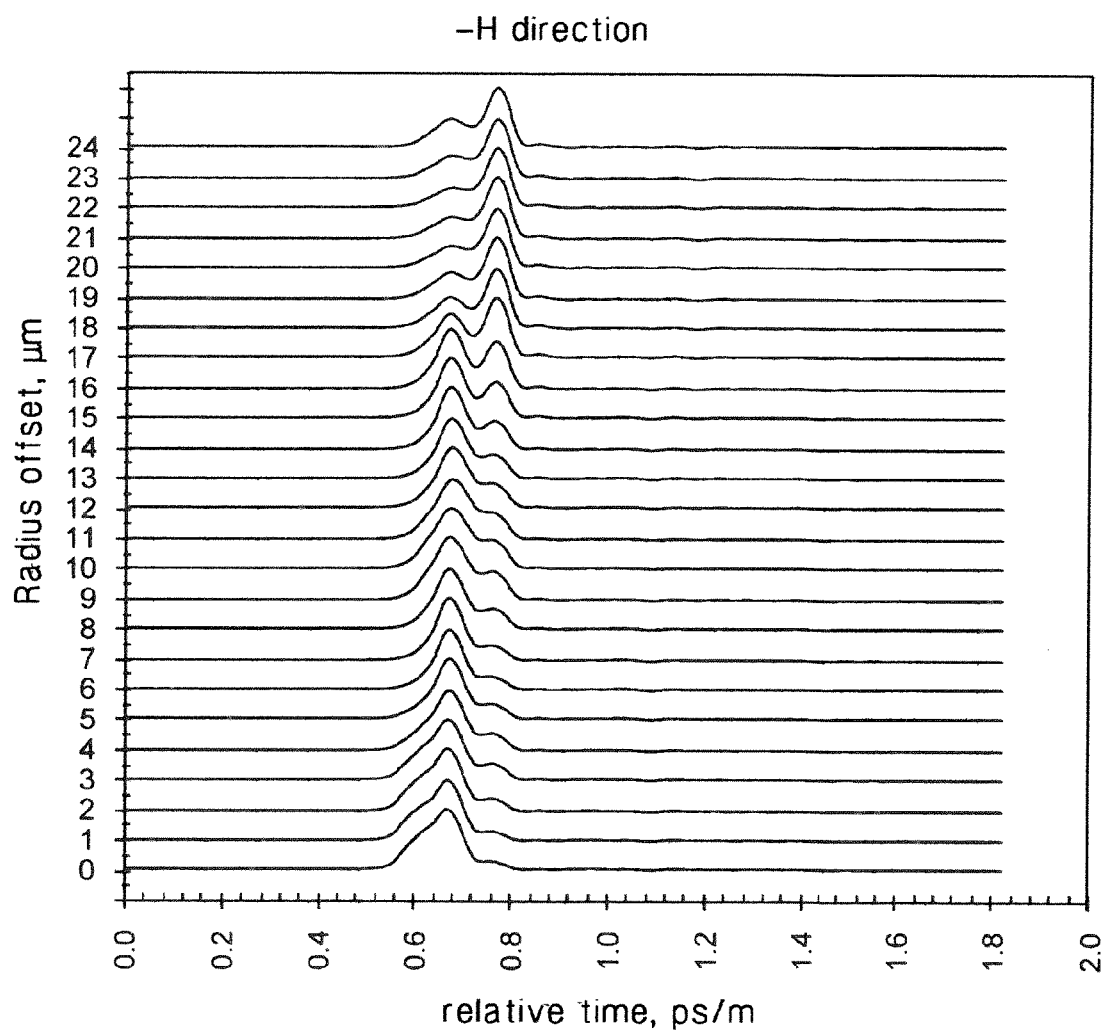
FIG. 4B depicts a graph of a resultant DMD waveform for a test VCSEL plot obtained by convoluting the ideal DMD waveforms with spectral data using a new algorithm, in accordance with one embodiment of the present invention.

Using the algorithm disclosed in U.S. Patent Application Ser. No. 61/237,827, we calculated the DMD for the transmitter used in a Bit Error Rate (BER) test system for a simulated fiber having an ideal DMD waveform. The difference in center wavelength across the core of the fiber for this VCSEL is 0.72 nm. Applying the new algorithm, we see that the calculated DMD waveforms (FIG. 4B) at larger radial offsets are shifted to the right (i.e. longer delays) due to material dispersion. Hence, the traditional "ideal" parabolic refractive index profile that yields a DMD with all waveforms temporally aligned is not optimum for this VCSEL. To minimize total dispersion (or maximize system bandwidth) the core refractive index profile of MMF must be modified to compensate for the relative material dispersion (or chromatic dispersion) of the fiber modes. Given the spectral characteristics of a laser, the required compensation can be calculated using the algorithm disclosed in U.S. Patent Application Ser. No. 61/237,827. The algorithm disclosed in U.S. Patent Application Ser. No. 61/237,827 provides a more accurate characterization of the system performance of a MMF channel link.

In general, VCSEL transceivers used in high-speed data communication networks exhibit a spatially dependent wavelength emission pattern that, when coupled into fiber, produces a wavelength dependency in the supported guided modes. Although other parameters to quantify the radial dependence of the fiber-coupled spectrum may be used, we define a new parameter $\Delta\lambda_c$, to be the maximum difference in center wavelength between the radial spectrums across the core of a MMF. Based on a statistical distribution of $\Delta\lambda_c$ for a representative set of optical transceivers for 10 Gbps Ethernet (10GBASE-SR), and 8 Gb/s Fibre Channel, a new DMD specification is proposed for the design and fabrication of laser-optimized MMF. The new DMD specification compensates for the radially dependent shift in wavelengths of the optical channel. As an example, in FIG. 5 we show $\Delta\lambda_c$ for a sample 10 Gb/s transceiver, where, $\Delta\lambda_c$=0.53 nm. We note that if the coupled optical power is restricted to a small region of the fiber core, then the compensation must be adjusted based on $\Delta\lambda_c$ for the reduced radial region.

By modifying the refractive index profile, we can adjust the speed of the guided modes to compensate for the effect of material dispersion based on the distribution of wavelengths. As a result, an improved MMF having reduced total dispersion can be realized. The modifications to the refractive index profile can be quantified using DMD waveform data which characterizes the modal propagation delays in the fiber.

We can quantify the material dispersion in MMF by measuring the wavelength-dependent time of flight of guided modes. One method, as used herein, is to tune the wavelength of a titanium-sapphire laser used in a DMD measurement test bed. Clearly, other laser devices can be used including tunable and fixed wavelength lasers. Since the maximum difference in refractive index across the fiber core is small (<1%), in general it is only necessary to characterize the wavelength-dependent time of flight for fiber-coupled modes corresponding to one radial offset.

Figure 6:
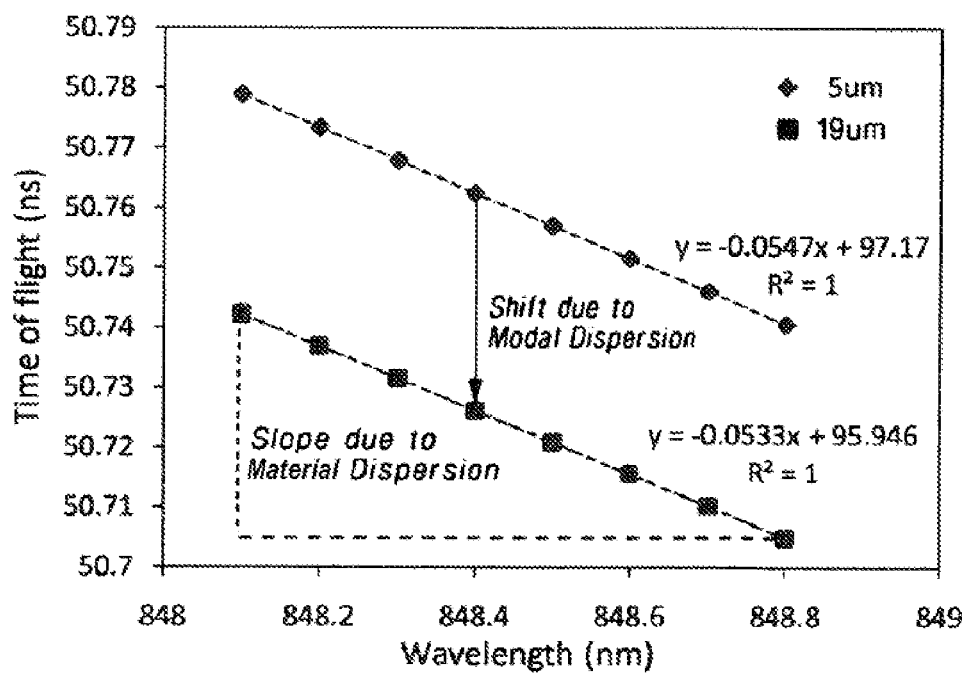
FIG. 6 depicts a graph of wavelength dependent time of flight for two radial offsets (5 and 19 μm offsets) propagating through a 550 m length of MMF.

With reference to FIG. 6, the time of flight is plotted for two radial launch offsets, 5 and 19 µm, propagating through a 550 m length of MMF. Each of the two curves in FIG. 6 quantifies the material dispersion of the fiber, n(λ). Longer wavelengths have shorter delay times and therefore travel faster. The vertical shift in the curves is due to the difference in modal propagation delay, or modal dispersion, between the two radial modes and is not related to material dispersion. The data shows the slopes of the two curves are almost the same. By converting the absolute time of flight data shown in FIG. 6 to relative delay in picoseconds per meter (ps/m), we can relate the effects of material and modal dispersion, where the delay due to modal dispersion is derived from DMD waveform data.

Figure 7:
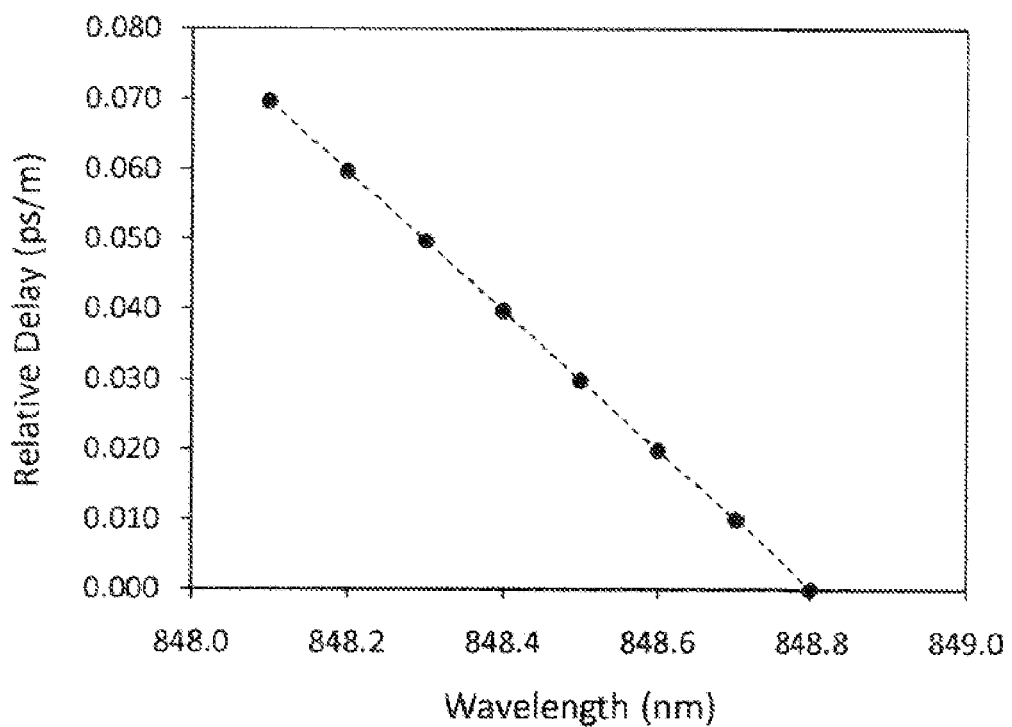
FIG. 7 depicts a graph of relative delay derived from time of flight measurements.

With reference to FIG. 7, the delay due to material dispersion for the 5 µm offset is plotted. The data points for the 19 µm are not shown in FIG. 7 since they are nearly identical.

The time of flight data in FIGS. 6 and 7 are for a test fiber that exhibits significantly higher system performance than predicted by current DMD and EMB metrics. With reference to FIG. 3, analysis of the fiber's DMD data shows that the high-order modes at 19 μm offset traverse the fiber faster than the low-order modes at 5 μm, offset by about 0.066 ps/m, which is the modal dispersion. When excited by the VCSEL transmitter, the modes for these two radial offsets (5 and 19 μm offsets) will differ in center wavelength. Spectral analysis of the fiber modes when excited by the VCSEL used reveals that the modes at 19 μm offset have a central wavelength of about 848.1 nm, whereas the modes at 5 μm offset have a central wavelength of 848.8 nm. From the time of flight (TOF) curve shown in FIG. 7, we see that this difference in central wavelength corresponds to a difference in relative time delay of 0.070 ps/m. However, since the optical spectrum of high-order modes at 19 μm have shorter center wavelengths, on average the modes travel slower. Therefore, the negative material dispersion (−0.070 ps/m) will compensate for the positive modal dispersion (+0.066 ps/m) reducing the total system dispersion to 0.004 ps/m. Hence, the fiber introduces little dispersion and performs better than predicted by conventional DMD and EMB measurement methods. This asymmetry in DMD waveform radial delay is not considered in the current, standard test methods.

For a given laser source or TOSA and radial variation in central wavelength of the coupled fiber modes, we can calculate the relative delay the fiber modes will undergo due to material dispersion. The refractive index of the fiber can then be modified so that modes will travel faster or slower, on average, to compensate for material dispersion. For an emission pattern that emits shorter wavelengths into larger angles (e.g., VCSELs), when coupled into the fiber, high-order fiber modes will travel relatively slower than low-order modes. In this case, the refractive index must be reduced at larger radial offsets so that high-order modes travel faster. The objective is to balance the relative delays of the guided fiber modes with the wavelength-dependent material dispersion the modes will undergo so that the resultant total dispersion is minimized. Once the relative delays required to compensate for material dispersion are known, the necessary adjustments to the refractive index profile can be made. The required change in refractive index can be calculated by its relationship to the mode phase velocity, $$n(\lambda) = \frac{c}{v(\lambda)} \quad (4)$$

where c is the speed of light (299,792,458 m/s), and v is the mode phase velocity (m/s).

Since each transceiver exhibits a unique spatial spectral distribution, the difference in radial spectrum central wavelengths ($\Delta\lambda_c$) must be estimated for a nominal transceiver that will minimize the effect of material or chromatic dispersion. An accurate understanding of the coupling of VCSELs' wavelength-dependent spatial emission patterns into MMF will lead to an improved design parameter. If different classes of VCSEL transceivers (for example those used for Fibre Channel and those used for Ethernet) exhibit different radially dependent wavelength emission patterns, the optimum fiber design parameters can be determined for each application. It may be practical to sort fiber for application specific performance ("tailored" MMF).

Figure 8A:
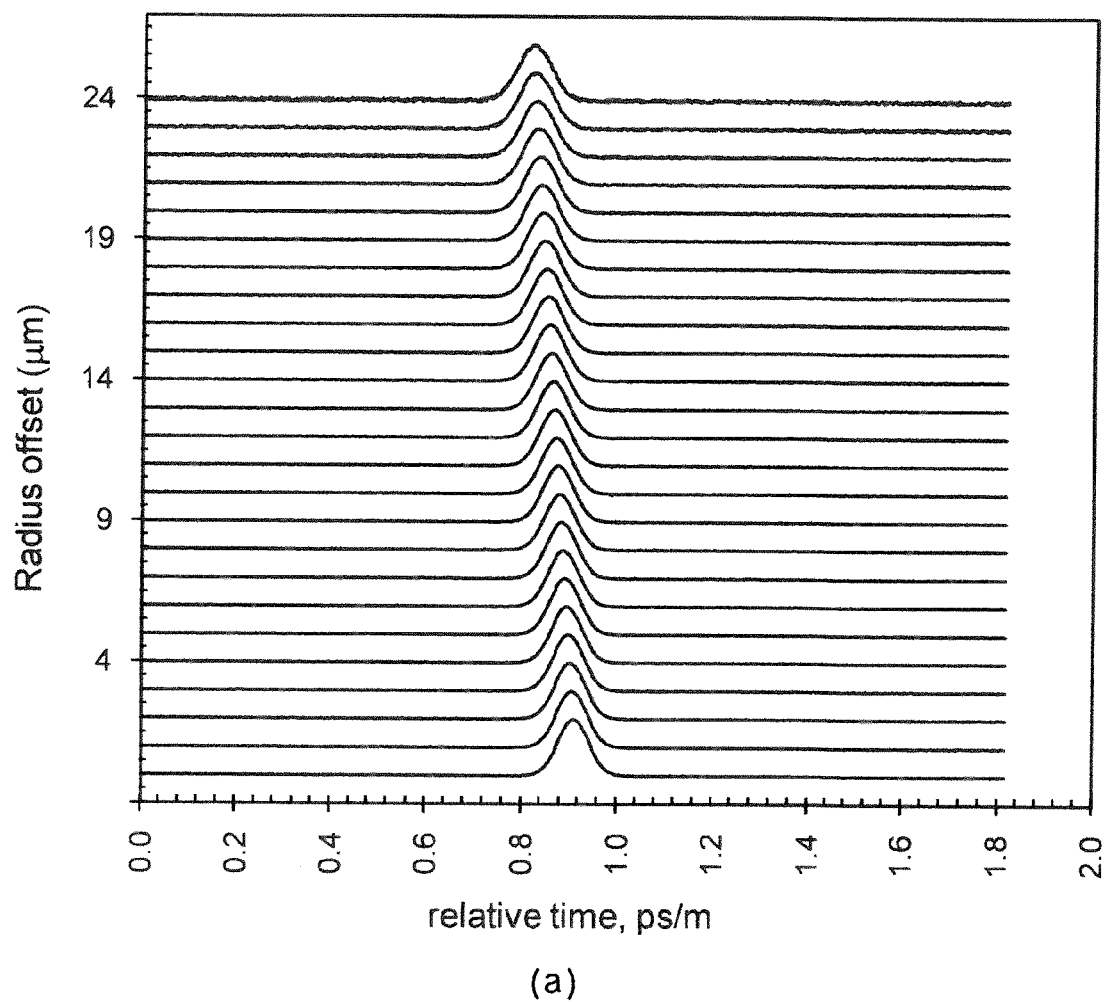
FIG. 8A depicts a graph of a DMD waveform plot having a monotonic reduction in delay from 0 to 24 μm across the core of the fiber.
Figure 8B:
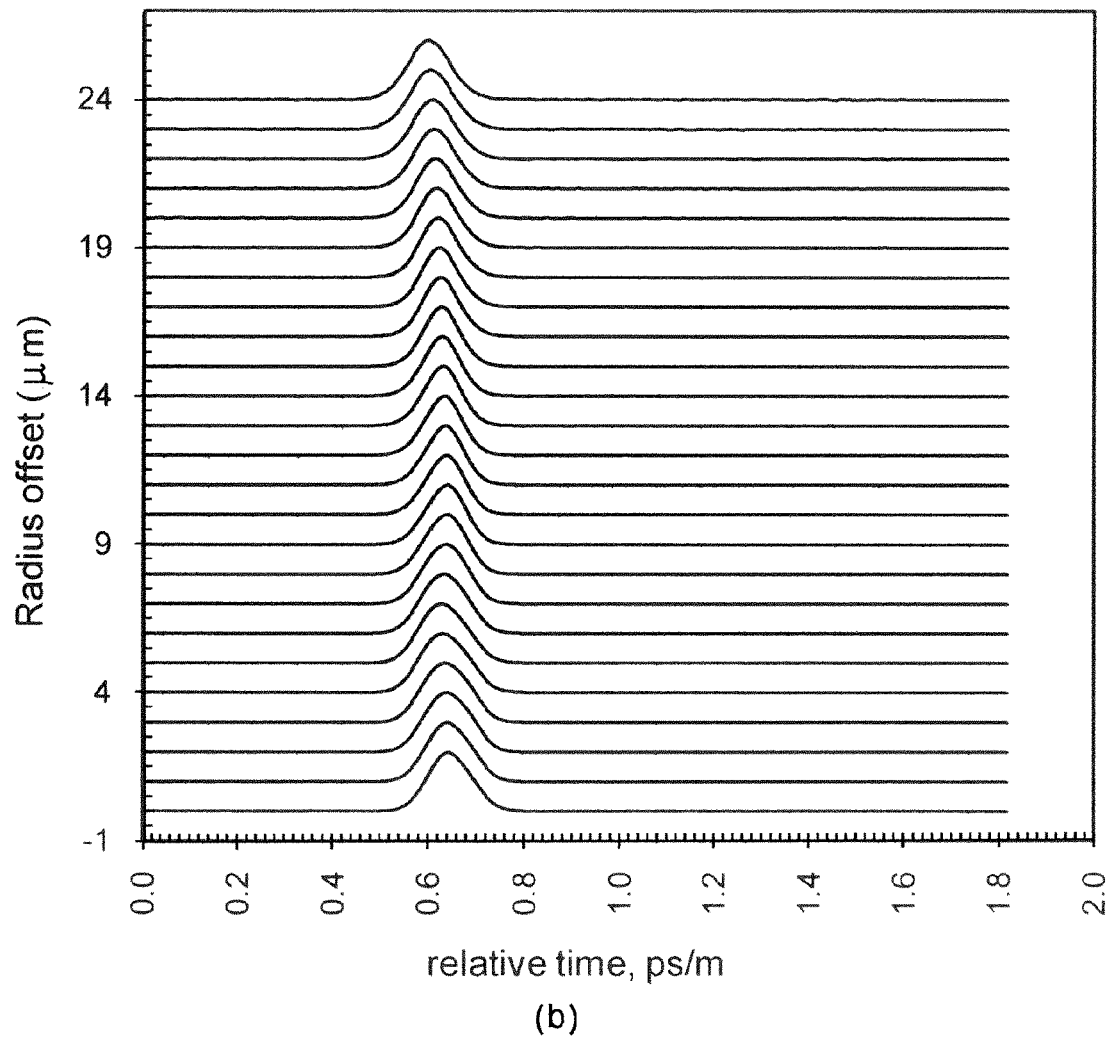
FIG. 8B depicts a graph of a resultant DMD waveform plot when convoluted with a radial shift in center wavelength of $\Delta\lambda_c$=0.53 nm.

As an example, the effect of material dispersion has been compensated for a randomly selected VCSEL having a $\Delta\lambda_c$ of 0.53 nm. For this VCSEL, the refractive index profile should be adjusted so that the DMD waveforms peaks exhibit an overall relative shift in delay of about −0.04 ps/m from 0 to 24 μm, with shorter delay for larger radii. The compensation depends on both the $\Delta\lambda_c$ and the radial region of the core in which the modes are excited. One embodiment of the modified refractive index profile is to design for a monotonic shift in delay across the core of the fiber, as illustrated in FIG. 8A. The shift shown in FIG. 8A results in a 0.09 ps/m delay from 0 to 24 μm (a "left-tilted" shift). However, depending on the laser source wavelength emission pattern and the fiber coupling characteristics, other radial shifts might be more appropriate. The calculated DMD waveforms (using the time domain algorithm disclosed in U.S. Patent Application Ser. No. 61/237,827) are shown in FIG. 8B. Close inspection of the calculated waveforms shows that the relative delays are nearly aligned, which results in low total dispersion.

Figure 9A:
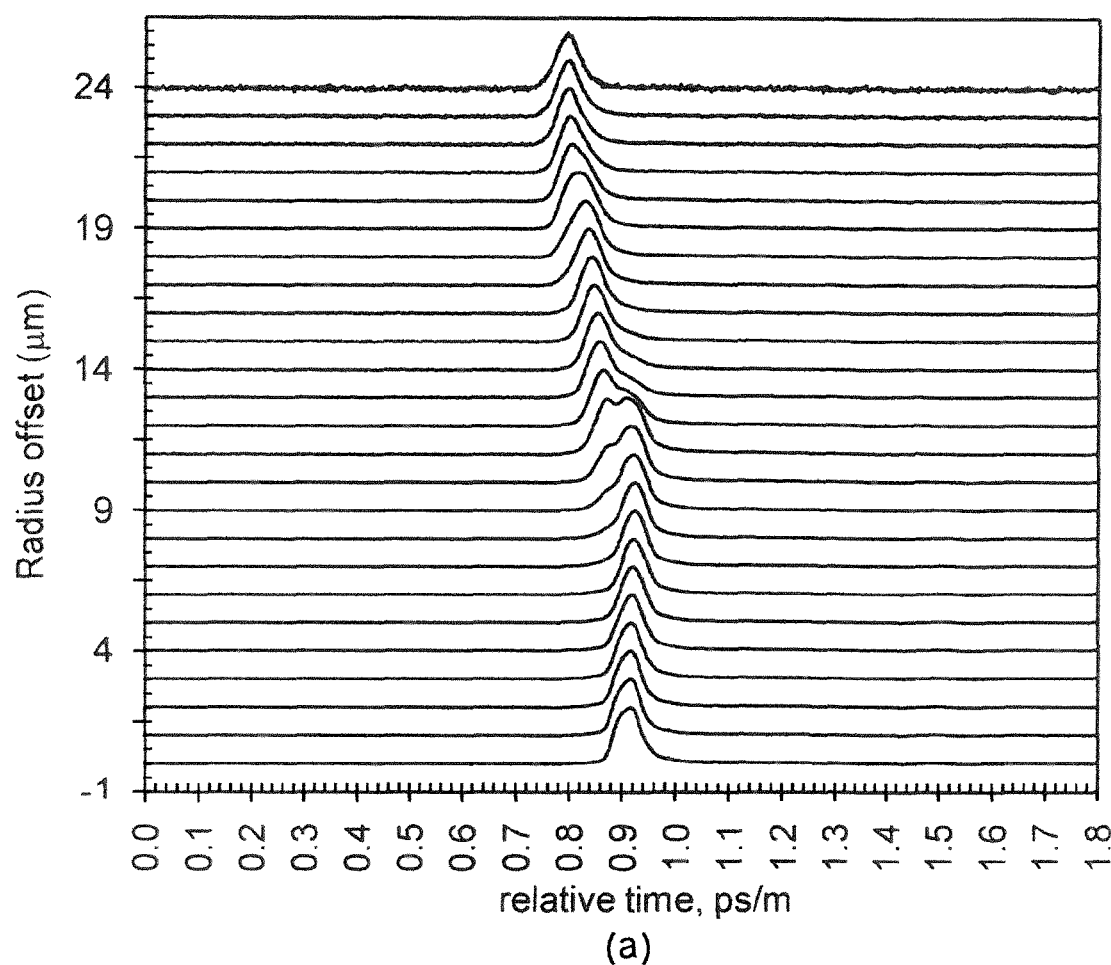
FIGS. 9A and 9B depict graphs of DMD waveform plots for two MMF's in the same cable with virtually identical DMD and EMB metrics, in accordance with one embodiment of the present invention. The fiber with a left shift, plotted in FIG. 9A, shows better BER system performance than the fiber with the right shift, plotted in FIG. 9B.
Figure 9B:
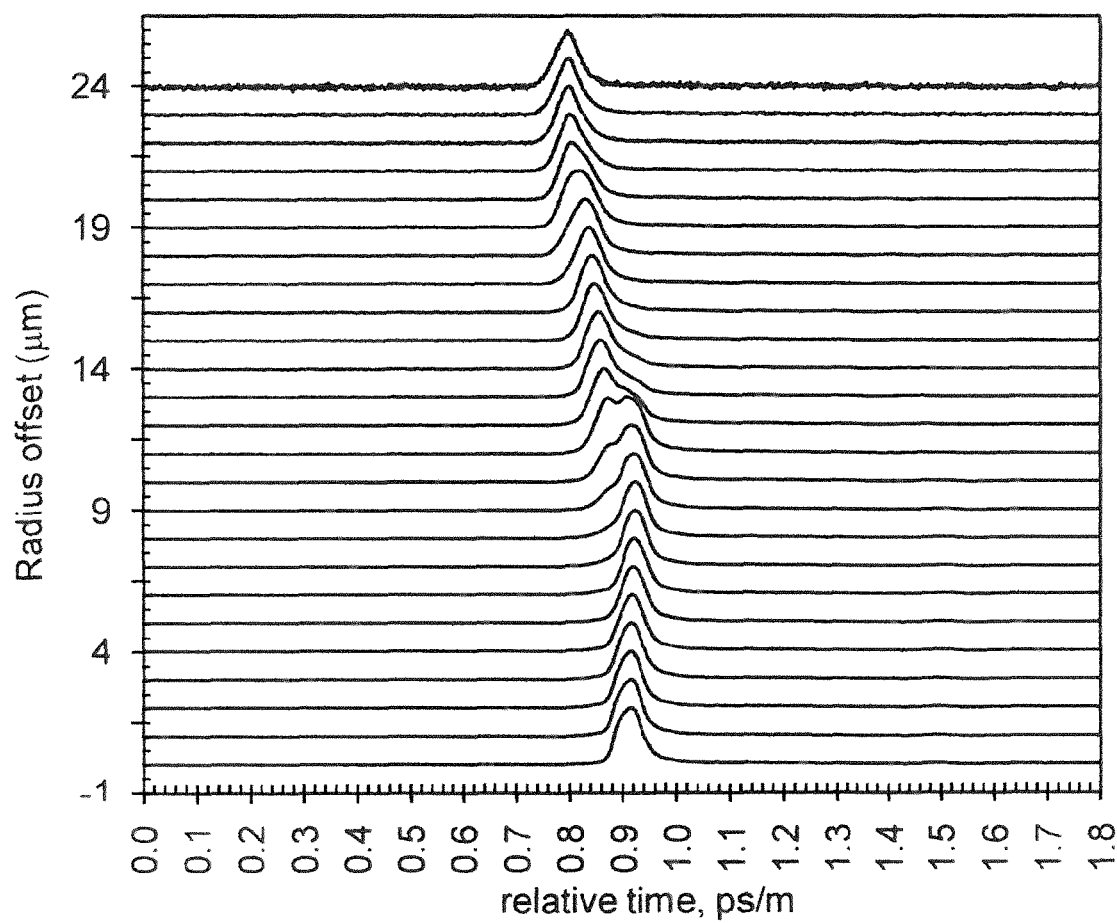

To verify the new DMD specification, the new algorithm was applied to the two sample fibers whose DMD waveforms are shown in FIGS. 9A and 9B. Based on the current test method, the measured DMDs and EMBs for these two fibers are virtually identical (with an EMB of approximately 4543 MHz*km), yet their measured Bit Error Rate (BER) system performances differ by more than two orders in magnitude, where fiber (a) exhibits higher system performance. We note that although the DMDs for these two fibers are the same, the peaks of their radial waveforms shift in opposite directions (delay) at larger radii ("left" vs. "right" shifted fiber).

Figure 10A:
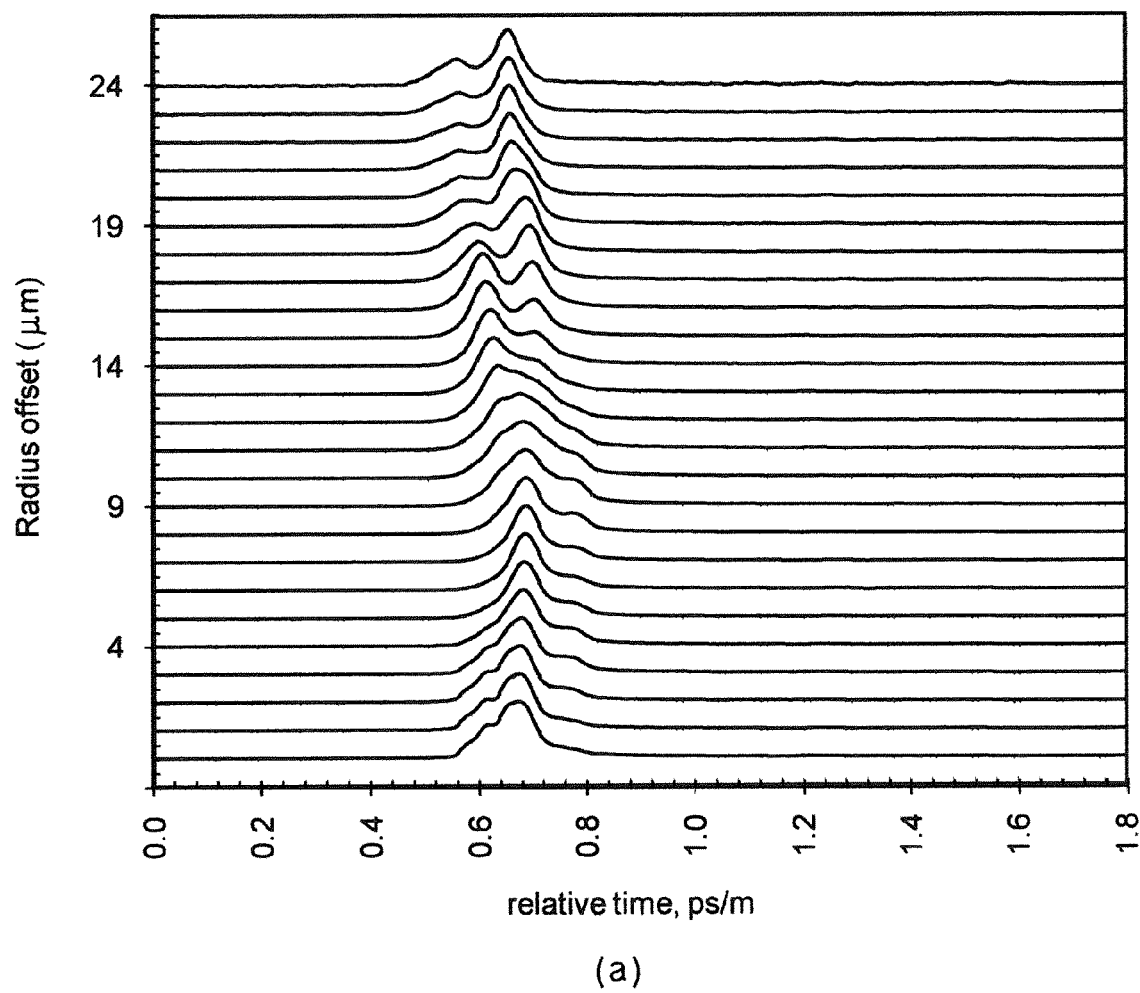
FIGS. 10A and 10B depict graphs of calculated DMD waveform plots for the same two fibers characterized in FIGS. 9A and 9B, respectively.
Figure 10B:
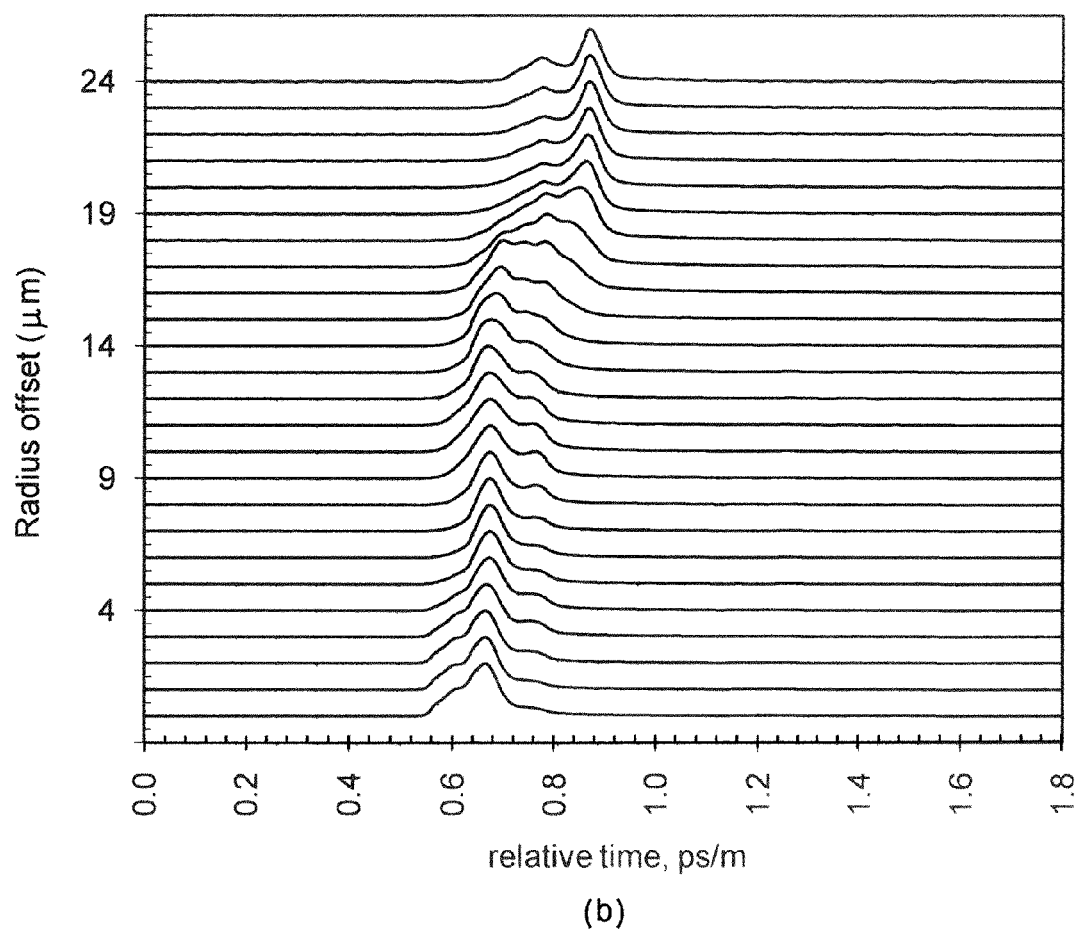

Using the algorithm, the calculated DMD waveforms for these two fibers for the spectral characteristics of our BER test system VCSEL are presented in FIGS. 10A and 10B. We see that the DMD waveforms in FIG. 10A are more aligned than those in FIG. 9A. Whereas the DMD waveforms in FIG. 10B are shifted more to the right (at larger radii) than those in FIG. 9B. The minimum calculated bandwidth (minEMBc) for these two fibers are 3524 MHz*km and 2913 MHz*km predicting a 20% difference in bandwidth. The specified bandwidth of the fiber (EMB) is related to calculated minimum EMB (minEMBc) by a factor of 1.13, i.e., EMB=1.13× minEMBc. This difference in calculated bandwidth is also observed in the new calculated DMD. Hence, the algorithm disclosed in U.S. Patent Application Ser. No. 61/237,827 correctly predicts the observed difference in system performance between these two fibers.

Figure 11A:
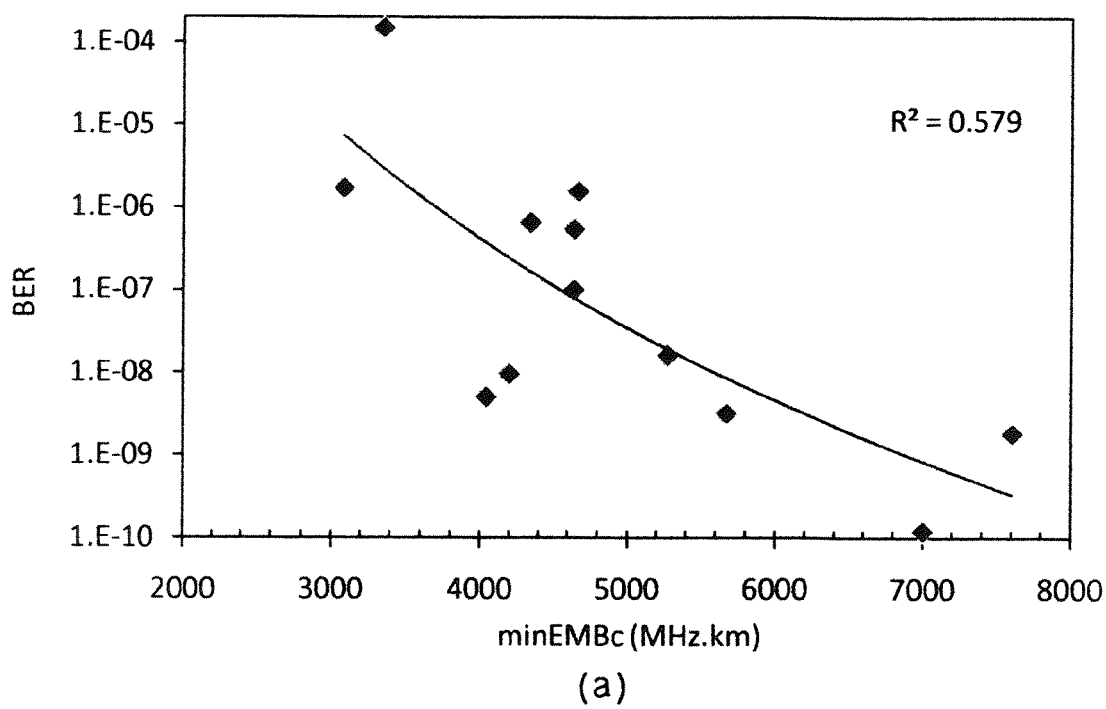
FIG. 11A depicts a graph of measured minEMBc using a standard test method, in accordance with one embodiment of the present invention.
Figure 11B:
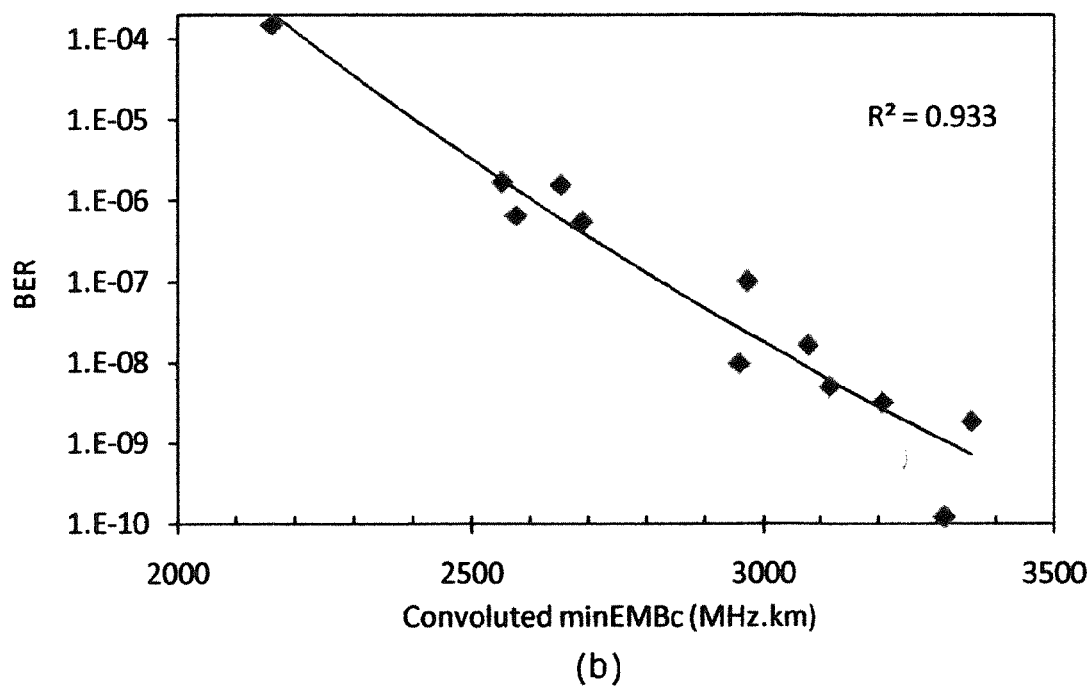
FIG. 11B depicts a graph of a newly calculated and convoluted minEMBc, in accordance with one embodiment of the present invention.
Figure 11C:
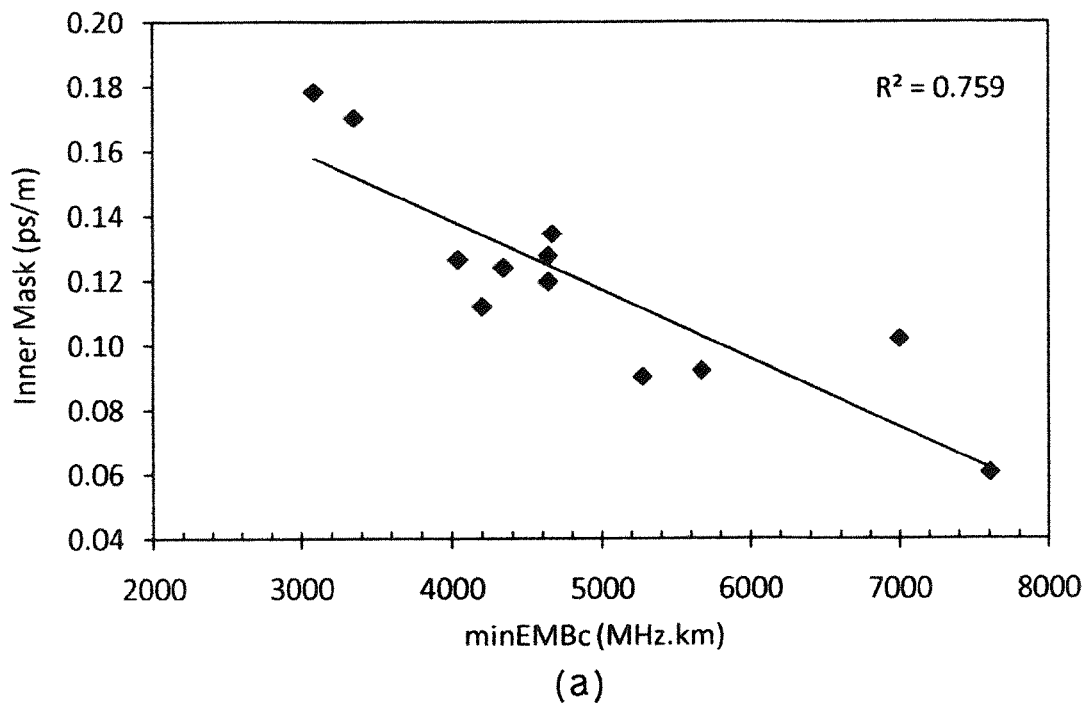
FIG. 11C depicts a graph of measured DMD, Inner Mask specification, using a standard test method, in accordance with one embodiment of the present invention.
Figure 11D:
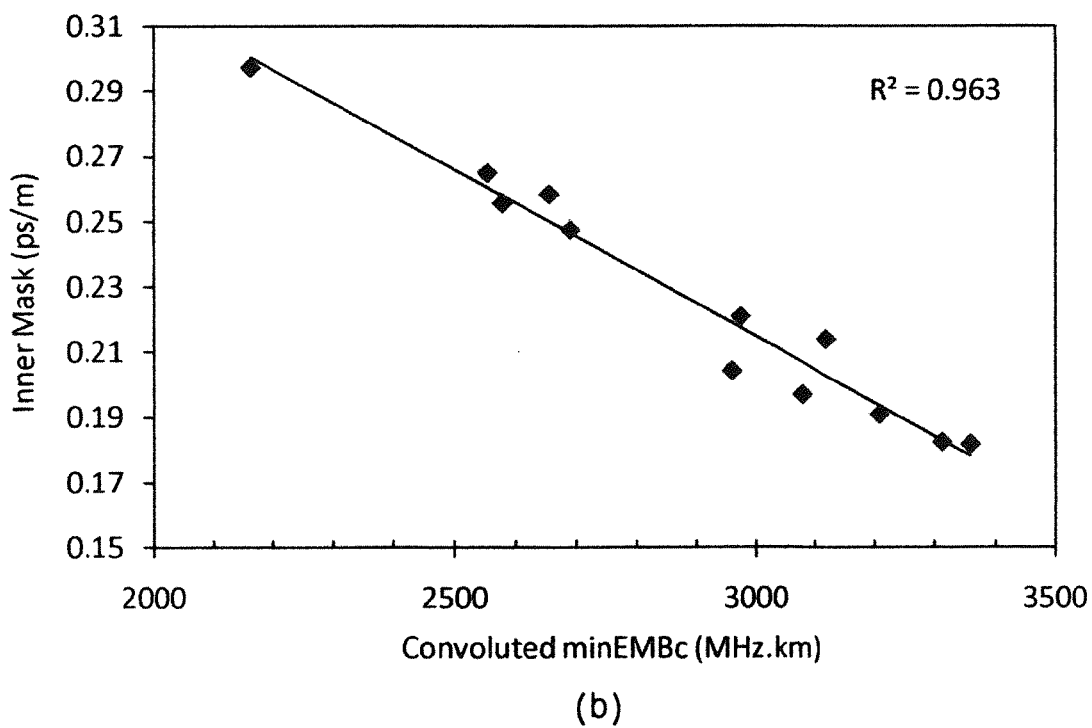
FIG. 11D depicts a graph of newly calculated and convoluted DMD, Inner Mask specification, in accordance with one embodiment of the present invention.

Applying the algorithm to all fibers in a cable we can compare the standard and predicted minEMBc and DMD (Inner Mask specification) metrics with BER system performance, as shown in FIGS. 11A, 11B, 11C, and 11D. The predicted metrics of FIGS. 11B and 11D, show a much improved correlation to measured system performance ($R^2$=0.58 vs. $R^2$=0.93) and DMD ($R^2$=0.76 vs. $R^2$=0.96).

FIG. 11A depicts a graph of measured minEMBc using a standard test method, in accordance with one embodiment of the present invention. FIG. 11B depicts a graph of a newly calculated and convoluted minEMBc, in accordance with one embodiment of the present invention. FIG. 11C depicts a graph of measured DMD, Inner Mask specification, using a standard test method, in accordance with one embodiment of the present invention. FIG. 11D depicts a graph of newly calculated and convoluted DMD, Inner Mask specification, in accordance with one embodiment of the present invention.

Figure 12:
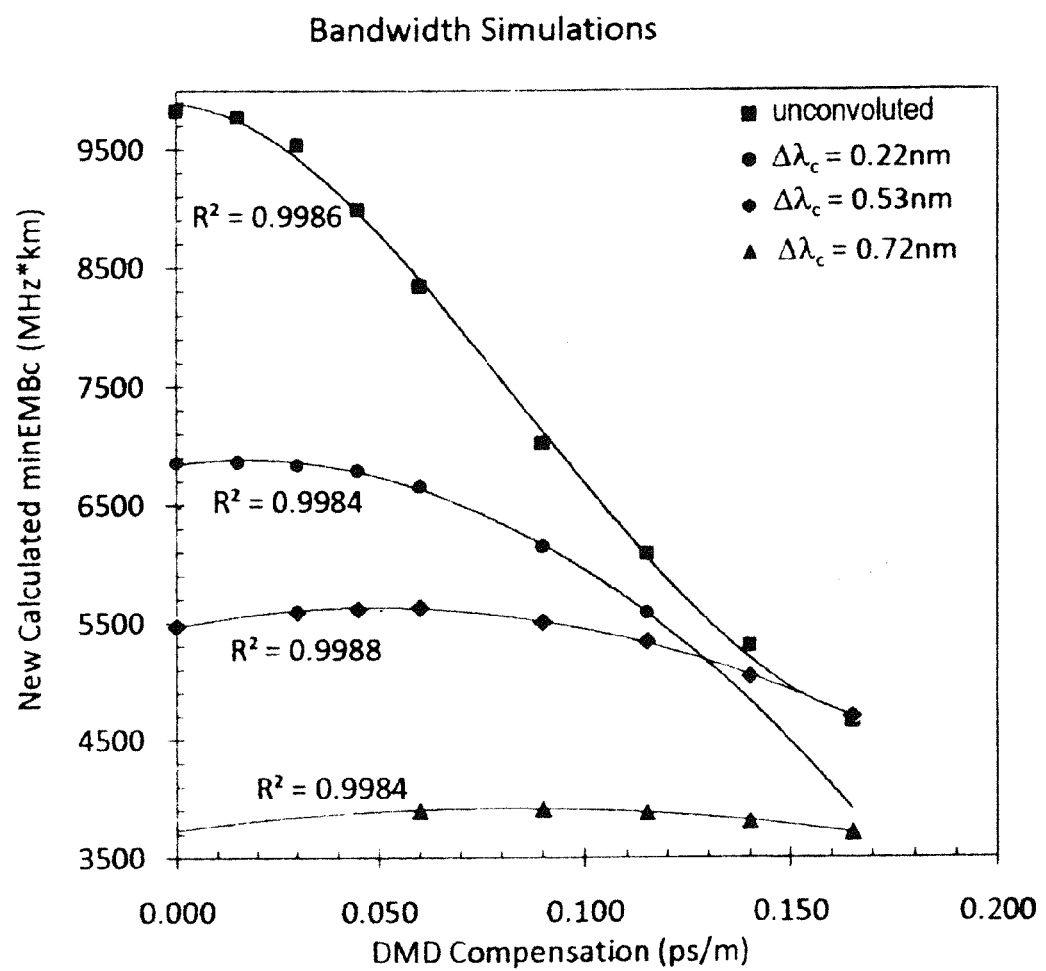
FIG. 12 depicts a graph of calculated minEMBc for three transceivers with different $\Delta\lambda_c$, in accordance with one embodiment of the present invention.

The new algorithm disclosed in U.S. Patent Application Ser. No. 61/237,827 can be extended to the design specifications of MMF fiber by characterizing the shift in DMD required to compensate for the average VCSEL and radial wavelength distribution in coupled fiber modes. The compensation is defined as the monotonic shift in the DMD waveform peaks across the core of the fiber, 0 to 24 μm offsets. To determine the shift needed to compensate for the effect of $\Delta\lambda_c$, the minEMBc are calculated for a set of simulated fibers with different amounts of linear DMD shift (as shown in FIG. 8A for a 0.09 ps/m shift from 0 to 24 μm). With reference to FIG. 12, the calculated minEMBc (for three representative transceivers selected to cover the sampled range in FIG. 8) are plotted for varying degrees of DMD compensation. The curve labeled "unconvoluted" depicts the decrease in minEMBc as we increase the amount of compensation (shift in DMD waveforms). The standard algorithm predicts a higher value of minEMBc when all the waveforms are aligned (zero DMD compensation for "unconvoluted" curve).

Figure 13:
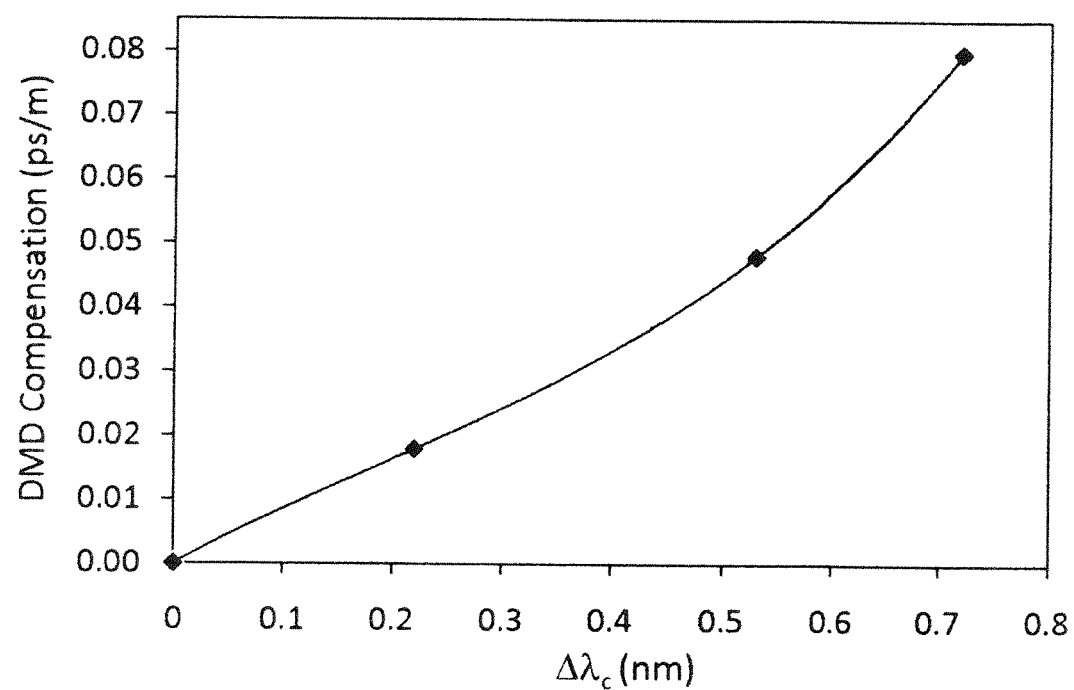
FIG. 13 depicts a graph of DMD compensation required to maximize the calculated fiber bandwidth for minEMBc, in accordance with one embodiment of the present invention.

With reference to FIG. 13, by extracting the maximum new calculated minEMBc for each of the curves in FIG. 12, the optimum DMD compensation for a given transceiver ($\Delta\lambda_c$) can be determined.

Based on an analysis of our sample set of 10GBASE-SR compliant transceivers (18 devices) we should compensate for an average $\Delta\lambda_c$ of 0.4 nm. Using FIG. 13, the required compensation from 0-24 μm is −0.04 ps/m for 10 Gbps Ethernet.

Figure 14:
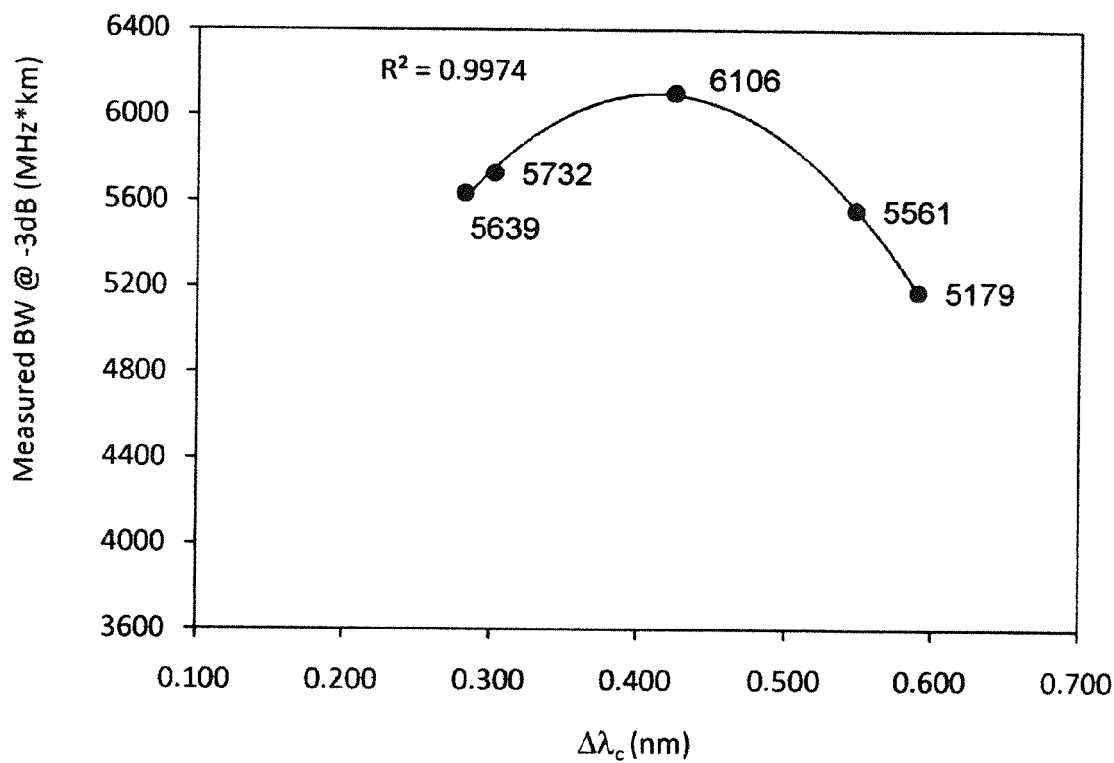
FIG. 14 depicts a graph of a fiber sample A 3 dB bandwidth measurements using five different transceivers, in accordance with one embodiment of the present invention.
Figure 15:
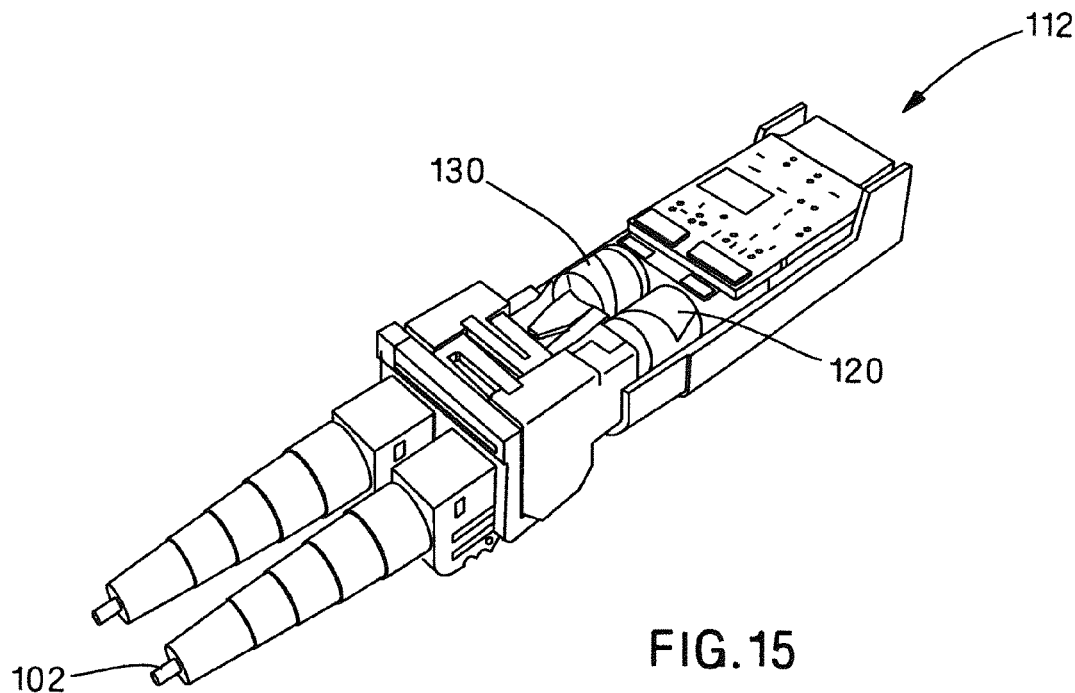
FIG. 15 depicts a perspective view of a transceiver showing a transmitter optical sub-assembly (TOSA), in accordance with one embodiment of the present invention.
Figure 16:
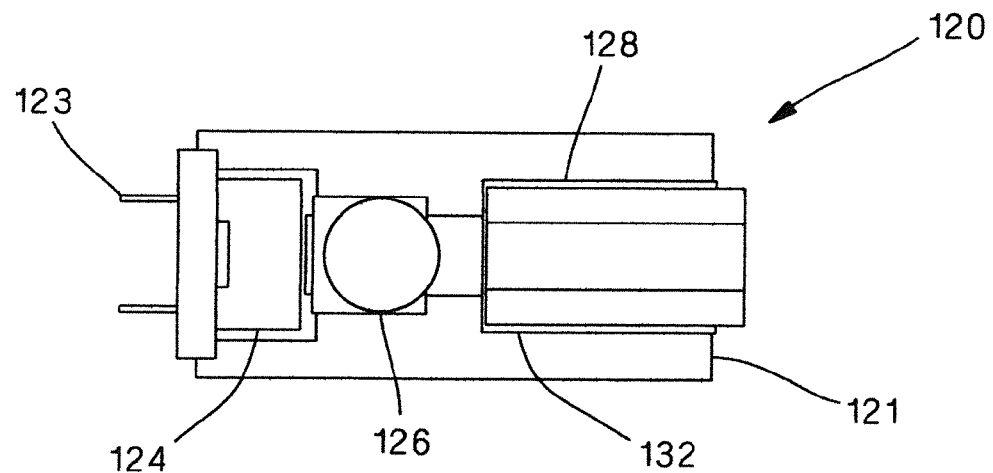
FIG. 16 depicts a cross-sectional schematic of a TOSA, in accordance with one embodiment of the present invention.

The DMD compensation for the sample fiber discussed above is close to this predicted optimum compensation value of −0.04 ps/m (from 0-24 μm). The 3 dB bandwidth for this fiber was measured using 5 different VCSEL transceivers. The optical spectrum of each of the VCSELs was measured across the core of the fiber. The correlation between measured bandwidth and $\Delta\lambda_c$ for a sample fiber using five different VCSEL transceivers is plotted in FIG. 14. The data verifies the maximum calculated bandwidth for this fiber is obtained for a $\Delta\lambda_c$ of 0.4 nm.

The new DMD specification disclosed herein should replace the current "ideal" DMD design metric. It is recognized that in practice, typical DMD waveform plots exhibit multiple radial delay shifts and mode splitting as a result of variations in the fabrication process. This does not detract from the basic design requirement for a new target refractive index profile as proposed herein. Assuming we design for a nominal transceiver, the fundamental requirement for improved MMF system performance is that the refractive index profile is biased such that the resultant DMD waveform plot shows a relative shift to lower propagation delays at larger radial offsets ("left" shifted). One acceptable metric is to insure the difference in delay between the 19 μm and 5 μm radial offsets is a negative number. Clearly, other radial offsets can be used; however we have found these values provide the best correlation to measured system performance.

For improved channel link performance it is proposed that the refractive index profile of laser optimized MMF be modified to compensate for the radially-dependent variation in center wavelength of the fiber modes when excited by VCSEL transceivers. For 10GBASE-SR compliant VCSEL transceivers, the refractive index profile should be modified so that the DMD waveform peaks exhibit a monotonic shift to shorter delays for increasing radial offsets. The proposed shift in DMD waveform peaks is −0.04 ps/m over the range of 0 to 24 μm. This value compensates for the average VCSEL transmitter and wavelength distribution of coupled fiber modes.

It is understood that for VCSEL transceivers or other sources that exhibit different radial dependent emission patterns, a different compensation will be required to correct for the radial variation in wavelengths. If the fiber-coupled modes exhibit a reversed radial dependent wavelength distribution (i.e., longer wavelengths coupled into high-order modes), the DMD compensation should be positive instead of negative. In general, any radial dependent wavelength distribution can be compensated for reduced total dispersion.

Due to variations in the fabrication process, the dispersion compensation for laser optimized MMF as specified herein (for 10 Gb/s Ethernet or high-speed Fibre Channel) shall meet a DMD waveform profile requirement of a left shift metric between 0 ps/m and 0.-0.14 ps/m for OM4 type MMF and 0 ps/m and −0.33 ps/m for OM3 type fiber, i.e., −0.14 ps/m<(delay at 19 μm−delay at 5 μm)<0.0 ps/m for OM4 and −0.33 ps/m<(delay at 19 μm−delay at 5 μm)<0.0 ps/m. In this manner, using this DMD waveform profile requirement, MMF can be manufactured which compensates for material dispersions as well as modal dispersions.

Based on a representative sample population of 10GBASE-SR and 2G/4G/8G Fiber Channel transceivers, it was empirically determined that the total dispersion of a transmitter and fiber system can be minimized for a DMD delay shift for OM4 type fiber between −0.01 ps/m and −0.04 ps/m.

In one aspect, the present invention provides for an optical transceiver comprising a transmitter optical sub-assembly (TOSA) that produces both a range of fiber-coupled optical power and a specified fiber-coupled spatial spectral distribution which compensates for material dispersion and modal dispersion effects.

Although any fiber coupled spatial spectral distribution with appreciable slope across the fiber core may result in material dispersion that may be compensated with an appropriately designed fiber, one preferred embodiment of the present invention, is to couple high-order VCSEL modes into high-order fiber modes, as shown in FIG. 17. This can be achieved by requiring more precise components within the TOSA and more precise control of the TOSA alignment during the manufacturing process. Preferably, the alignment of components within the TOSA is to a tolerance which is within 1 mm or less, and the components within the TOSA are manufactured to tolerances which are within 1 mm or less. Experimental data suggest this particular embodiment results in larger spectral distributions across the fiber core thereby offering a greater material dispersion effect that may be used for compensation.

Although it has been stated that material dispersion may be compensated by modal dispersion, for moderate bandwidth laser optimized fibers with effective modal bandwidths (EMBs) below 8 GHz·km and commercially available transceivers, the effects of modal dispersion are greater in magnitude than material dispersion and so it may be customary to say modal dispersion may be at least partially compensated by material dispersion.

Figure 19:
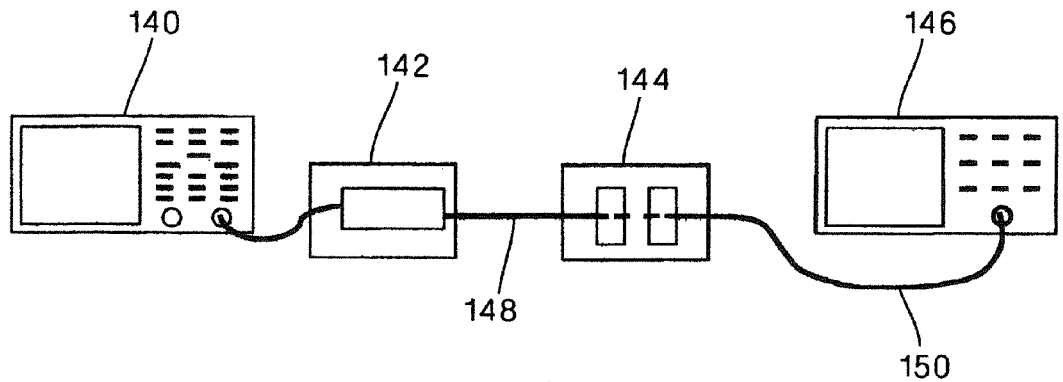
FIG. 19 depicts an experimental setup used to measure a fiber-coupled spatial spectral distribution for multimode fiber transceivers, in accordance with one embodiment of the present invention.
Figure 20:
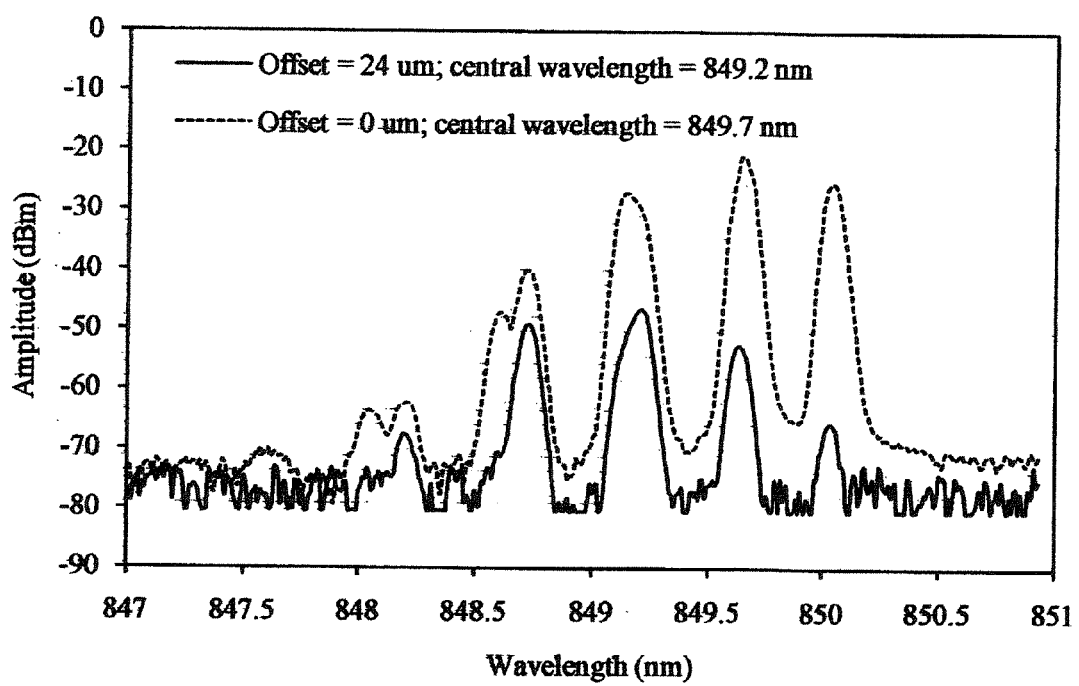
FIG. 20 depicts a graph showing a measured fiber-coupled spectrum at two different fiber core radii: r=0 μm and r=24 μm for a particular transceiver, in accordance with one embodiment of the present invention.
Figure 21:
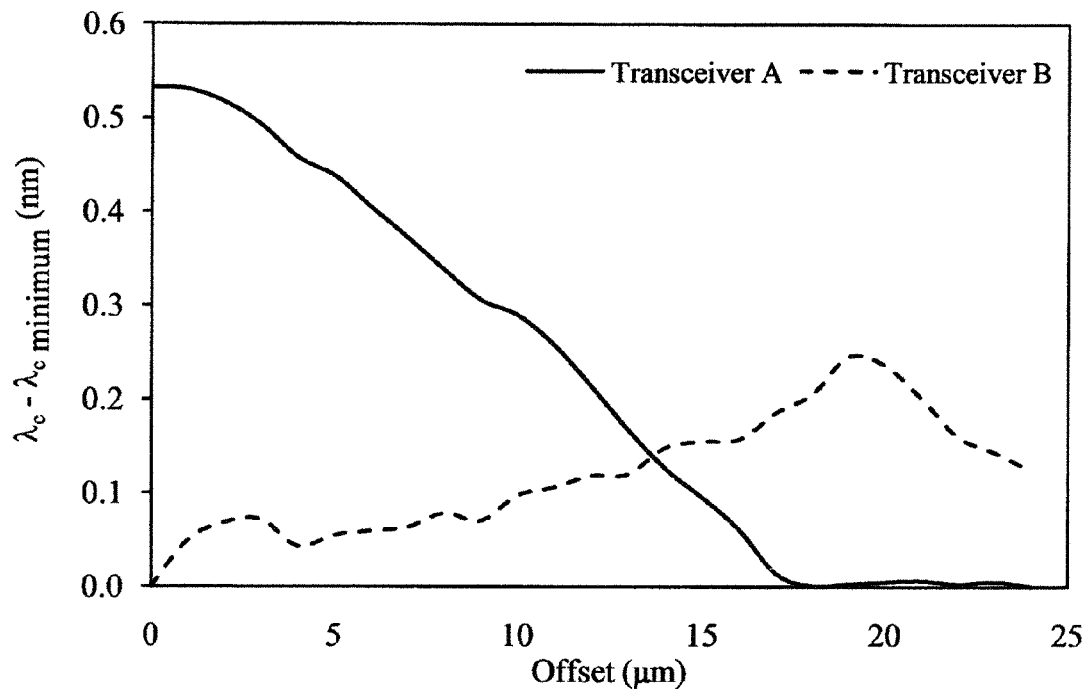
FIG. 21 depicts a graph showing a change in calculated central wavelength across a fiber core for a first and second transceiver, in accordance with one embodiment of the present invention.

With reference to FIGS. 19, 20, and 21, a series of experiments are represented which quantify the fiber coupled spatial spectral distribution for short wavelength, high bit rate, multimode fiber transceivers which are compliant with 10 Gb/s Ethernet and 8 Gb/s Fibre Channel standards. In these experiments, an unmodified transceiver 142 was powered up and modulated with either a 10 Gb/s or an 8 Gb/s Pseudo Random Binary Sequence (PRBS). The output of the transceiver 142 was coupled by mating an MMF patch cord 148 with an appropriate connector (LC) to the transceiver 142. The end-face of the distal end of the MMF patch cord 148 was aligned and then scanned with a single-mode fiber (SMF) patch cord 150 using a micro-positioning stage 144 and coupled into an optical spectrum analyzer (OSA) 146. With this experimental configuration, a fiber coupled spectrum was quantified across the core of the MMF patch cord 148.

FIG. 20 illustrates measured fiber coupled spectrum at two different fiber core radii: r=0 μm and r=24 μm for a particular transceiver. Note, that although the spectral components are largely similar, their magnitudes are not and therefore the calculated central wavelengths, $\lambda_c$, are different. The $\lambda_c$ at r=0 µm is 849.7 nm, while the $\lambda_c$ at r=24 µm is 849.2 nm.

With reference to FIG. 21, a calculated change in central wavelength, $\Delta\lambda_c$, ($\Delta\lambda_c=\lambda_c-\lambda_{c\ minimum}$) across a fiber core for two different transceivers is provided. It is understood that other metrics can be used to characterize the fiber coupled wavelength variation. Fiber coupled modes for transceiver A exhibit a decreasing $\lambda_c$ versus fiber core offset for transceiver B where the spectrum has a higher amplitude of shorter wavelengths. From this information, it may be inferred that components within the first TOSA for transceiver A are precise and in good alignment. Conversely, the fiber coupled modes for transceiver B exhibits an increasing $\lambda_c$ versus fiber core offset corresponding to the situation in which lower-order VCSEL modes, are coupled into higher-order fiber modes. Moreover, it can be inferred that the components within the second TOSA for transceiver B are imprecise and/or are not in good alignment. In summary, the magnitude and uniformity of the center wavelength variation depends on the VCSEL and optical sub-assembly alignment. This fiber coupled spatial spectral distribution, along with inherent dispersive properties of glass which cause index of refraction to vary with wavelength, results in material dispersion.

In traditional MMF, within the 850 nm wavelength region, the refractive index decreases with increasing wavelength and so shorter wavelength radiation travels slightly slower, due to the increased refractive index, than longer wavelength radiation. Knowledge of a specific fiber coupled spatial spectral distribution may be used to determine both the effects of material dispersion and also the specific amount (the direction and the magnitude) of modal dispersion that may perfectly compensate and nullify material dispersion. Therefore a fiber can be intentionally designed and fabricated to possess a particular amount of modal dispersion that will effectively balance the material dispersion resulting from a particular fiber coupled spectral distribution. Although the material dispersion effects resulting from a particular transceiver/TOSA may be well compensated for with a specially designed fiber refractive index profile, it is commercially impractical to optimize fiber and transceiver combinations individually; instead, this compensation must be performed en masse.

Figure 22:
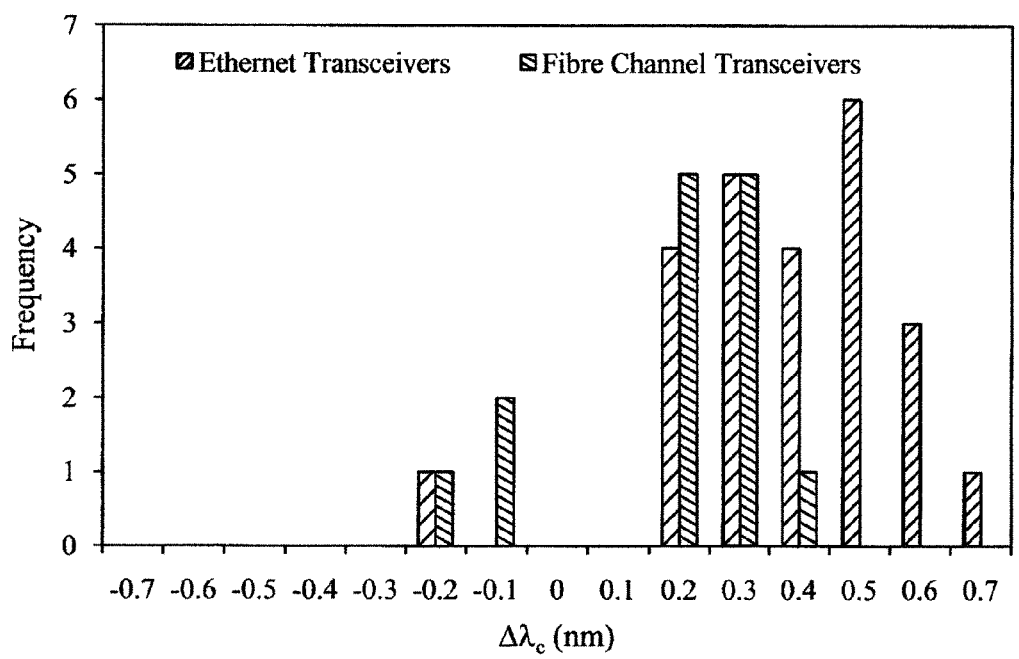
FIG. 22 depicts a histogram of the maximum difference in a fiber-coupled central wavelength across the core of a reference multimode fiber for thirty-eight short wavelength, high bit rate, multimode fiber transceivers, in accordance with one embodiment of the present invention.

In an effort to better understand the range of transceiver fiber coupled spatial spectral distributions, the difference in fiber coupled central wavelength between the inner fiber core region, 0 µm to 5 µm, and outer fiber core region, 19 µm to 24 µm, for thirty-eight short wavelength, high bit rate, multimode fiber transceivers was determined. Twenty-four of the transceivers were compliant with 10 Gb/s Ethernet and fourteen were compliant 8 Gb/s Fibre Channel. These transceivers were manufactured by several suppliers including Finisar Corporation of Sunnyvale, Calif., Avago Technologies of San José, Calif., Fiberxon Inc., and JDS Uniphase of Milpitas, Calif. A histogram of this data is provided in FIG. 22. The sign convention of $\Delta\lambda_c$ was defined such that if $\lambda_c$ in the inner region, 0 µm to 10 µm, >$\lambda_c$ in the outer region, 11 µm to 24 µm $\Delta\lambda_c$ is positive. Transceiver A in FIG. 21 had $\Delta\lambda_c$=0.621 nm and Transceiver B in FIG. 21 had $\Delta\lambda_c$=-0.29 nm Unfortunately, as is shown in FIG. 22, there is considerable spread in the calculated delta central wavelength across the fiber core for the population of transceivers tested and therefore, there is a correspondingly large spread in dispersion that must be compensated for by the fiber's modal dispersion. Consequently, for well-compensated systems, numerous fibers would need to be designed and manufactured to accommodate the diversity of this population. Moreover, since the fiber and transceiver are typically installed at different times it is impractical to match a particular fiber with a particular transceiver.

An alternate, less advantageous, embodiment is to couple the VCSEL modes such that the specified fiber coupled spatial spectral distribution has minimal spatial dependence. This particular embodiment would realize a minimal total dispersion when the fiber had minimum modal dispersion and the system would be limited by the effects of material dispersion. However, it should be noted that a well-compensated system would realize reduced total dispersion due to the fact that both modal and material dispersive effects can effectively be compensated.

The advantages of this invention are that it will facilitate higher performance optical links due to the fact that the total dispersion, including modal and material effects, can be minimized via precise dispersion compensation. Alternatively, due to the wide variation in fiber coupled spatial spectral distribution, modal and material dispersion can only be partially compensated by designing a fiber such that it optimizes the performance across the entire population.

Figure 23:
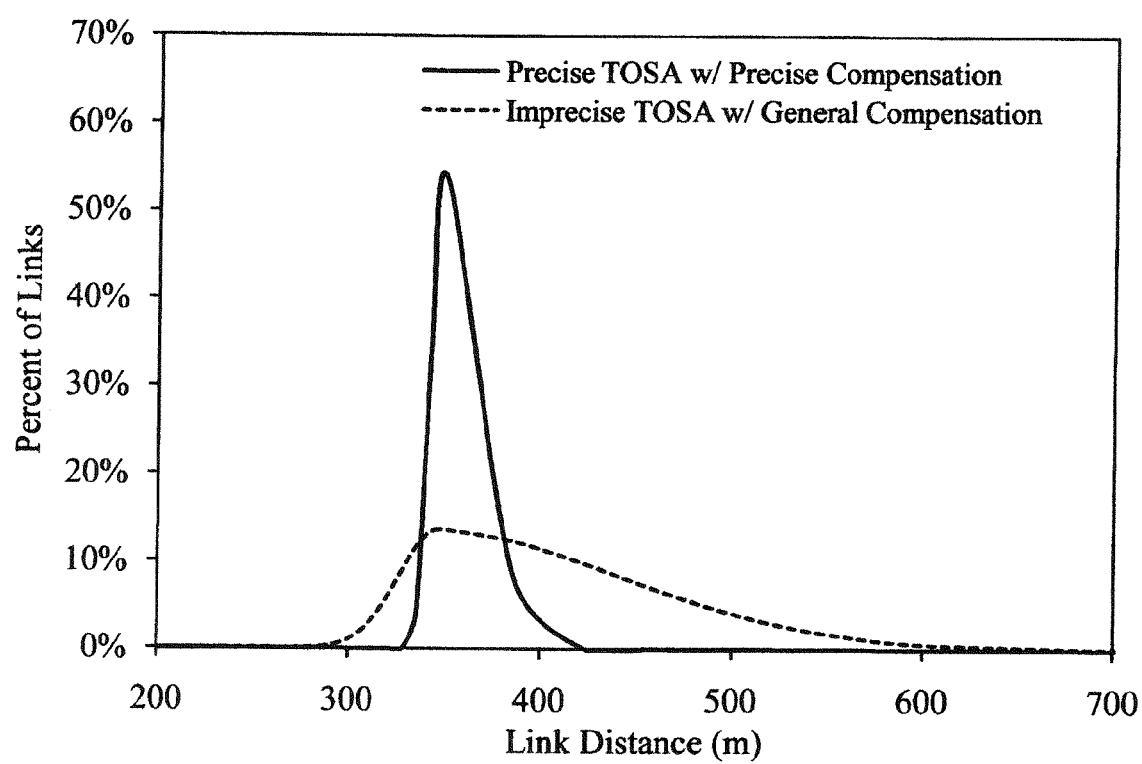
FIG. 23 depicts a graph showing calculated probability distributions of minimum optical link distances for: 1) links comprising TOSAs that do not specifically control fiber-coupled spatial spectral distribution and a fiber designed to generally compensate for this wide distribution; and 2) links comprising TOSAs with specifically controlled fiber-coupled spatial spectral distributions and a fiber designed to precisely compensate for material dispersion with modal dispersion, in accordance with one embodiment of the present invention.

With reference to FIG. 23, shown are calculated probability distributions of the minimum optical link distances for: 1) links comprising TOSAs that do not specifically control fiber coupled spatial spectral distribution and therefore represented by FIG. 22 and a fiber designed to generally compensate for this wide distribution; and 2) links comprising TOSAs with specifically controlled fiber coupled spatial spectral distributions and a fiber designed to precisely compensate for this material dispersion with modal dispersion.

As a result, one aspect of the present invention allows for a method for compensating for both material dispersion and modal dispersion effects in a multimode fiber transmitter optical sub-assembly. The method comprises measuring a fiber coupled spatial spectral distribution of the multimode fiber transmitter optical sub-assembly connected with a reference multimode fiber optic cable and determining the amount of material dispersion and modal dispersion present in the reference multimode fiber optic cable. Once the amounts of material dispersion and modal dispersion present is determined, then a TOSA or an improved MMF can be designed which compensates for at least a portion of the material dispersion and modal dispersion present in the reference multimode fiber optic cable resulting from the multimode fiber transmitter optical sub-assembly. This allows for transmission of optical signals within the MMF with increased bandwidth.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

The invention claimed is:

1. A method of manufacturing an improved multimode optical fiber for use with an optical source having a spatially dependent wavelength emission pattern, the fiber comprising:
   a cladding; and
   a core including a center, a maximum radius, and radial offsets being measured from the center, the core further including a refractive index profile, the method comprising the steps of:
generating an optical signal into a first end of a reference multimode fiber optic cable;
measuring a time of flight for the optical signal at a second end of the reference multimode fiber optic cable;
using the measured time of flight to determine an amount of chromatic dispersion and an amount of modal dispersion present in the reference multimode fiber cable; and
manufacturing the improved multimode optical fiber wherein the refractive index profile is designed to compensate for at least a portion of the chromatic dispersion and modal dispersion present in the reference multimode fiber optic cable.

2. The method of claim 1, wherein the refractive index profile is further designed to produce a differential mode delay that compensates for at least a portion of the chromatic dispersion and modal dispersion present in a fiber optic transmission system.

3. The method of claim 1, wherein the optical signal has a spatially dependent wavelength emission pattern;
wherein the step of generating the optical signal into the reference multimode fiber optic cable includes coupling the optical signal to the reference multimode fiber optic cable at at least a first and a second radial offset;
wherein the step of measuring the time of flight includes measuring times of flight of at least a first and a second wavelength component of the optical signal coupled to the first radial offset, and measuring a time of flight of at least a third wavelength component of the optical signal coupled to the second radial offset, wavelengths of the first and second wavelength components being different, and wavelengths of the third and first wavelength components being approximately same;
wherein the amount of chromatic dispersion is determined at least in part by the measured times of flight of the at least the first and the second wavelength component of the optical signal coupled to the first radial offset; and
wherein the amount of modal dispersion is determined at least in part by the measured time of flight of the at least the third wavelength component of the optical signal coupled to the second radial offset and the time of flight of the at least the first wavelength component of the optical signal coupled to the first radial offset.

4. The method of claim 1 or 3, wherein the refractive index profile of the improved multimode optical fiber is designed to produce a differential mode delay of −0.14 ps/m<(delay at 19 μm radial offset−delay at 5 μm radial offset)<0.0 ps/m.

5. The method of claim 1 or 3, wherein the refractive index profile of the improved multimode optical fiber is designed to produce a differential mode delay of −0.33 ps/m<(delay at 19 μm radial offset−delay at 5 μm radial offset)<0.0 ps/m.

6. The method of claim 1 or 3, wherein the refractive index profile of the improved multimode optical fiber is designed to provide an amount of modal dispersion to compensate for at least the portion of the chromatic dispersion and modal dispersion present in the reference multimode fiber optic cable.

7. The method of claim 6, wherein the refractive index profile of the improved multimode optical fiber produces a differential mode delay waveform plot having a monotonic reduction in delay from the center to the maximum radium.

8. The method of claim 6, wherein the refractive index profile of the improved multimode optical fiber produces a differential mode delay waveform plot having a monotonic reduction in delay of waveform peaks from 5 μm radial offset to 19 μm radial offset.

9. A method of manufacturing an improved multimode optical fiber for use with an optical source having a spatially dependent wavelength emission pattern, the fiber comprising:
a cladding; and
a core including a center, a maximum radius, and radial offsets being measured from the center, the core further including a refractive index profile,
the method comprising the steps of:
generating an optical signal having a spatially dependent wavelength emission pattern into a first end of a reference multimode fiber optic cable, the optical signal coupling to the reference multimode fiber optic cable at at least a first radial offset;
measuring at a second end of the reference multimode fiber optic cable times of flight of at least a first and a second wavelength component of the optical signal coupled to the first radial offset, wavelengths of the first and second wavelength components being different;
determining an amount of chromatic dispersion present in the reference multimode fiber cable at least in part by the measured times of flight of the at least the first and the second wavelength component of the optical signal coupled to the first radial offset; and
manufacturing the improved multimode optical fiber wherein the refractive index profile is designed to compensate for at least a portion of the chromatic dispersion present in the reference multimode fiber optic cable.

10. The method of claim 9, wherein the refractive index profile of the improved multimode optical fiber is designed to produce a differential mode delay of −0.14 ps/m<(delay at 19 μm radial offset−delay at 5 μm radial offset)<0.0 ps/m.

11. The method of claim 9, wherein the refractive index profile of the improved multimode optical fiber is designed to produce a differential mode delay of −0.33 ps/m<(delay at 19 μm radial offset−delay at 5 μm radial offset)<0.0 ps/m.

12. The method of claim 9, wherein the refractive index profile of the improved multimode optical fiber is designed to provide an amount of modal dispersion to compensate for at least the portion of the chromatic dispersion present in the reference multimode fiber optic cable.

13. The method of claim 12, wherein the refractive index profile of the improved multimode optical fiber produces a differential mode delay waveform plot having a monotonic reduction in delay from the center to the maximum radium.

14. The method of claim 12, wherein the refractive index profile of the improved multimode optical fiber produces a differential mode delay waveform plot having a monotonic reduction in delay of waveform peaks from 5 μm radial offset to 19 μm radial offset.

* * * * *